United States Patent
Baek et al.

(10) Patent No.: US 11,994,183 B2
(45) Date of Patent: May 28, 2024

(54) BRAKE ASSEMBLY WITH ACTIVE PISTON RETRACTION

(71) Applicant: HL MANDO CORPORATION, Gyeonggi-do (KR)

(72) Inventors: Hyungjin Baek, Novi, MI (US); Sudhir Kumar, Novi, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 239 days.

(21) Appl. No.: 17/513,861

(22) Filed: Oct. 28, 2021

(65) Prior Publication Data

US 2023/0135838 A1   May 4, 2023

(51) Int. Cl.

| | | |
|---|---|---|
| *F16D 55/22* | (2006.01) | |
| *F16D 55/226* | (2006.01) | |
| *F16D 65/18* | (2006.01) | |
| *F16D 121/04* | (2012.01) | |
| *F16D 121/24* | (2012.01) | |
| *F16D 125/08* | (2012.01) | |
| *F16D 125/40* | (2012.01) | |
| *F16D 127/02* | (2012.01) | |

(52) U.S. Cl.
CPC ............ *F16D 65/18* (2013.01); *F16D 55/226* (2013.01); *F16D 2121/04* (2013.01); *F16D 2121/24* (2013.01); *F16D 2125/08* (2013.01); *F16D 2125/40* (2013.01); *F16D 2127/02* (2013.01)

(58) Field of Classification Search
CPC .................. F16D 55/226; F16D 65/18; F16D 2055/0029; F16D 2121/04; F16D 2121/24; F16D 2125/40; F16D 2127/02; F16D 2129/065; B60T 13/741
See application file for complete search history.

(56) References Cited

U.S. PATENT DOCUMENTS

| | | | | |
|---|---|---|---|---|
| 5,046,404 | A | * | 9/1991 | Schnorenberg, Jr. ... F16D 65/18 92/130 B |
| 9,758,134 | B2 | * | 9/2017 | Yokoyama .......... F16D 55/2265 |
| 2019/0351890 | A1 | * | 11/2019 | Mennie ..................... B60T 8/34 |

FOREIGN PATENT DOCUMENTS

| | | | | |
|---|---|---|---|---|
| JP | 58128542 | A * | 1/1982 | ........... F16D 65/567 |
| JP | 2014-105785 | | 6/2014 | |

(Continued)

OTHER PUBLICATIONS

Machine translation of JP 58128542 (no date).*

*Primary Examiner* — Nicholas J Lane
(74) *Attorney, Agent, or Firm* — Ladas & Parry, LLP

(57) ABSTRACT

A brake assembly may comprise: a brake piston configured to be movable for a brake apply or release, the brake piston having an inner wall forming a piston cavity; a linearly movable structure positioned within the piston cavity of the brake piston; the linearly moveable structure configured to be linearly movable within the piston cavity in response to rotation of a rotatable structure operably coupled to the linearly movable structure; and a magnet disposed between the brake piston and the linearly movable structure so that the brake piston is movable toward the linearly movable structure in response to linear movement of the linearly movable structure by magnetic field generated by the magnet. The magnet may function to provide active retraction of the brake piston when the linearly movable structure moves in a brake release direction during a brake release operation.

16 Claims, 40 Drawing Sheets

BRAKE APPLY DIRECTION   BRAKE RELEASE DIRECTION

(56) References Cited

FOREIGN PATENT DOCUMENTS

KR  10-2015-0069695        6/2015
WO  WO-2009070198 A2 *  6/2009  ............. F16D 65/14

* cited by examiner

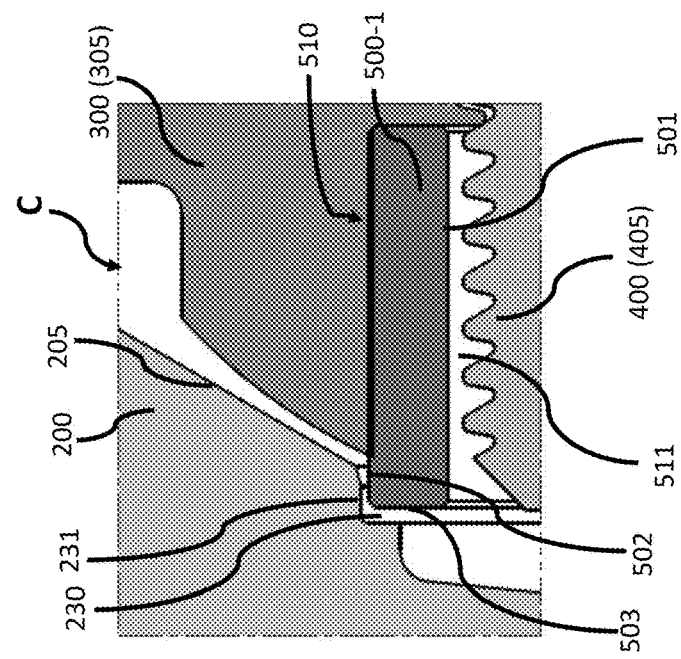
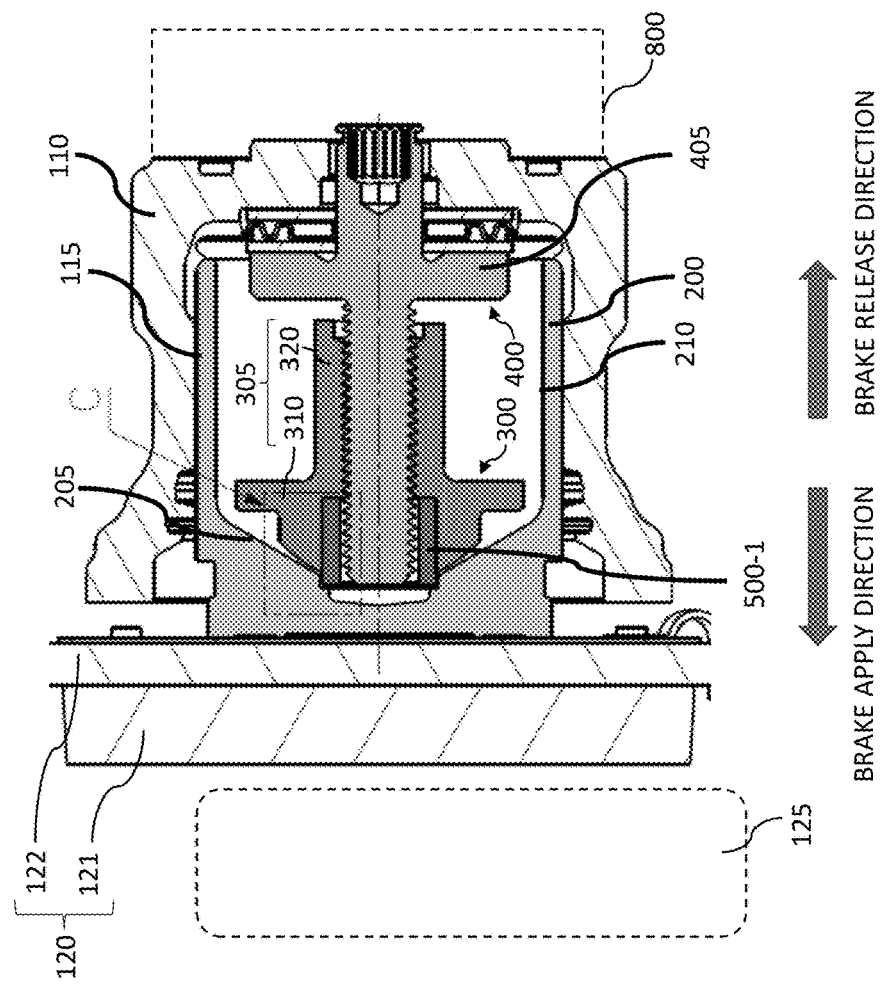
FIG. 3B
FIG. 3A

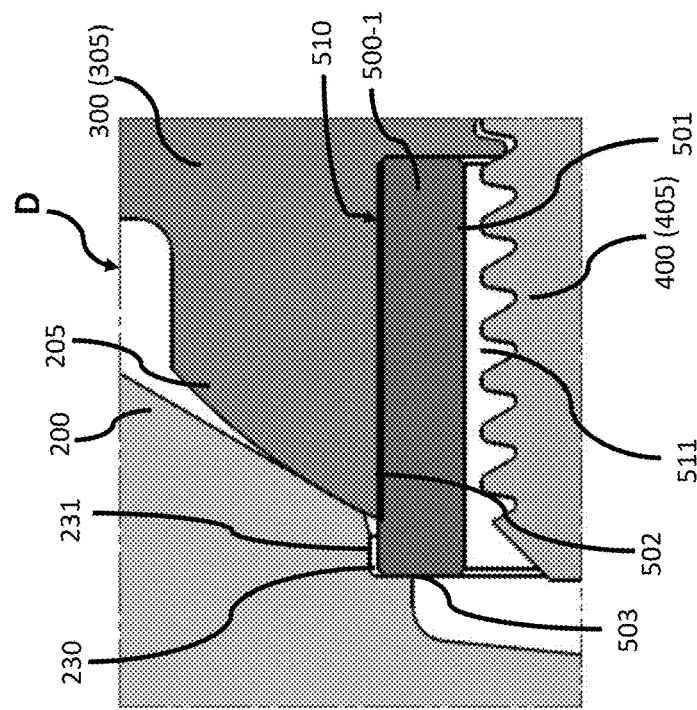
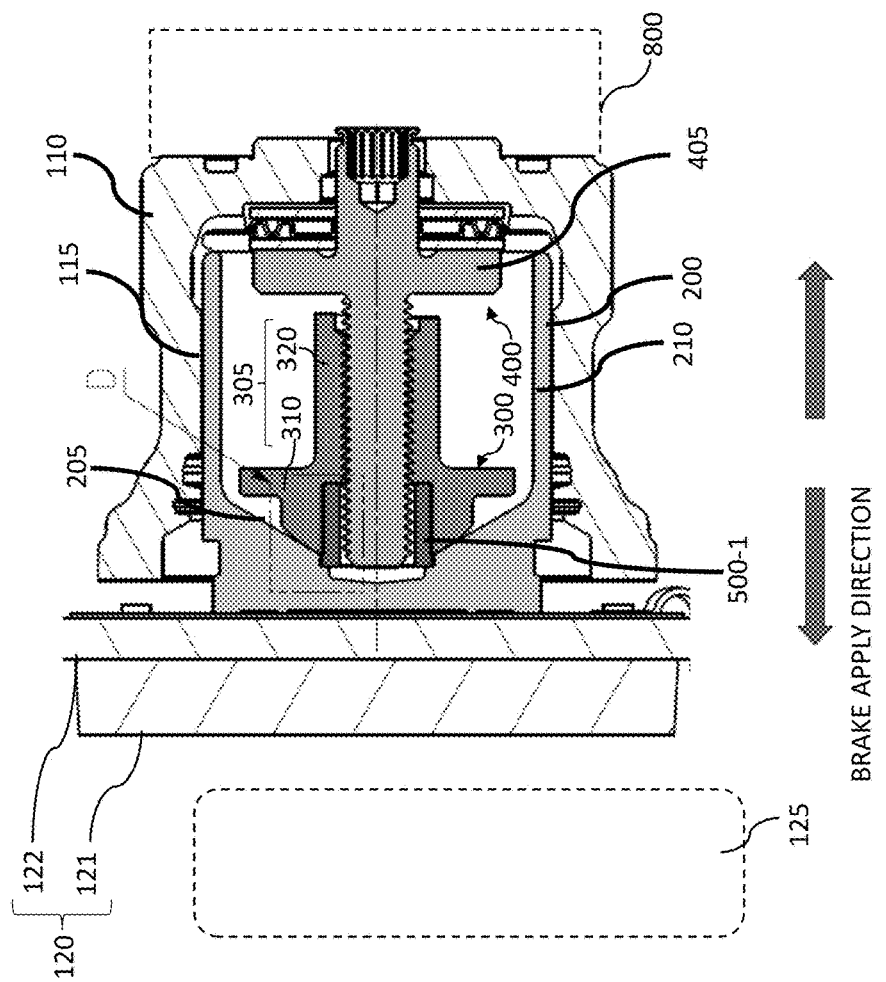
FIG. 4B
FIG. 4A

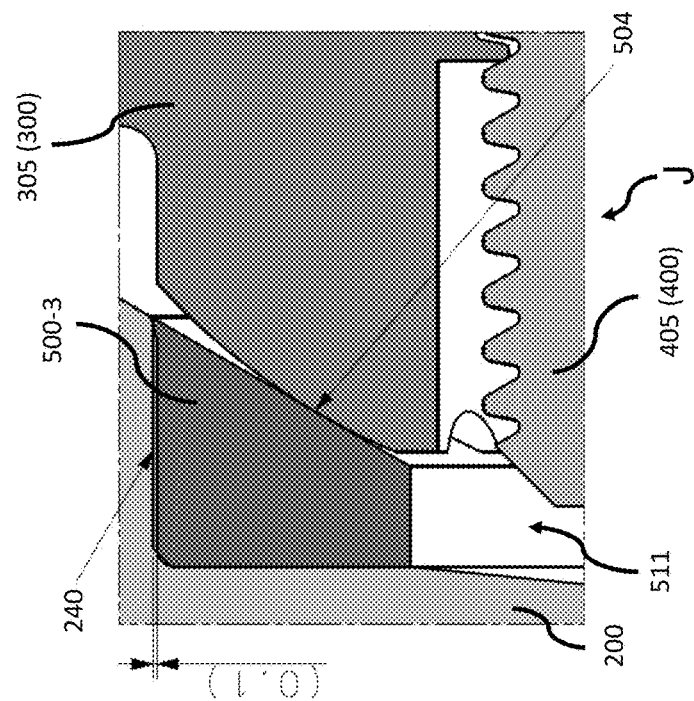
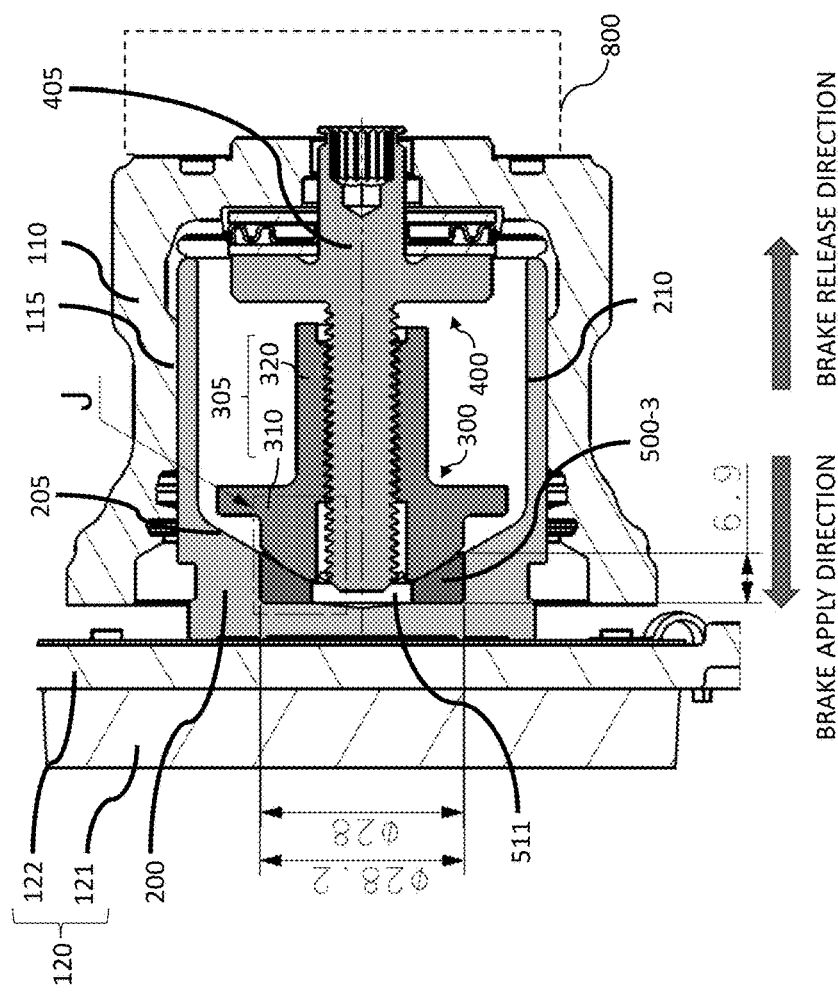
FIG. 12B
FIG. 12A

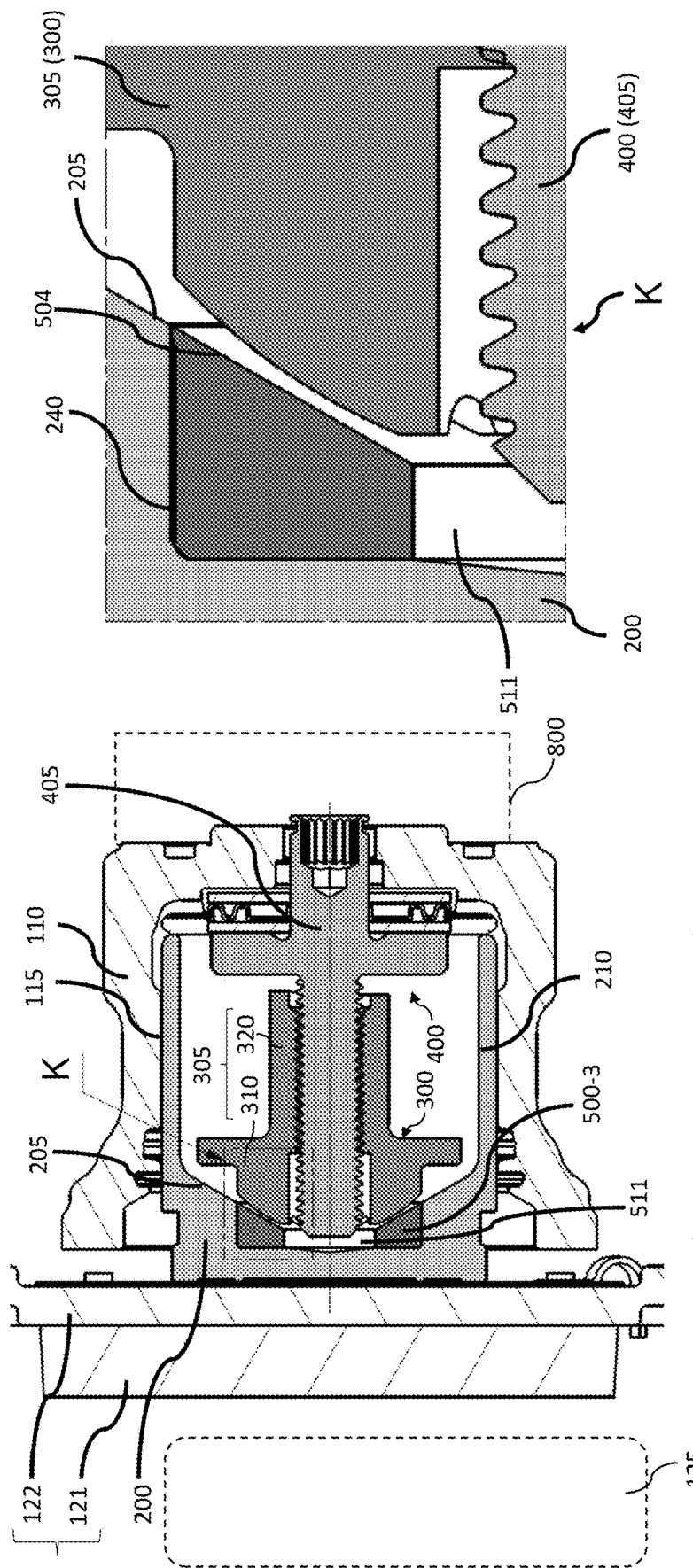

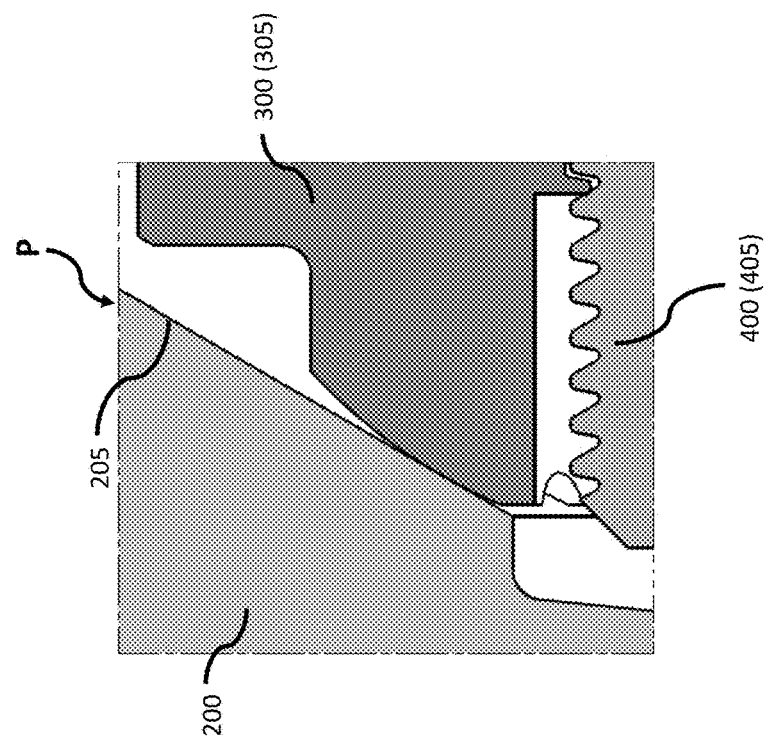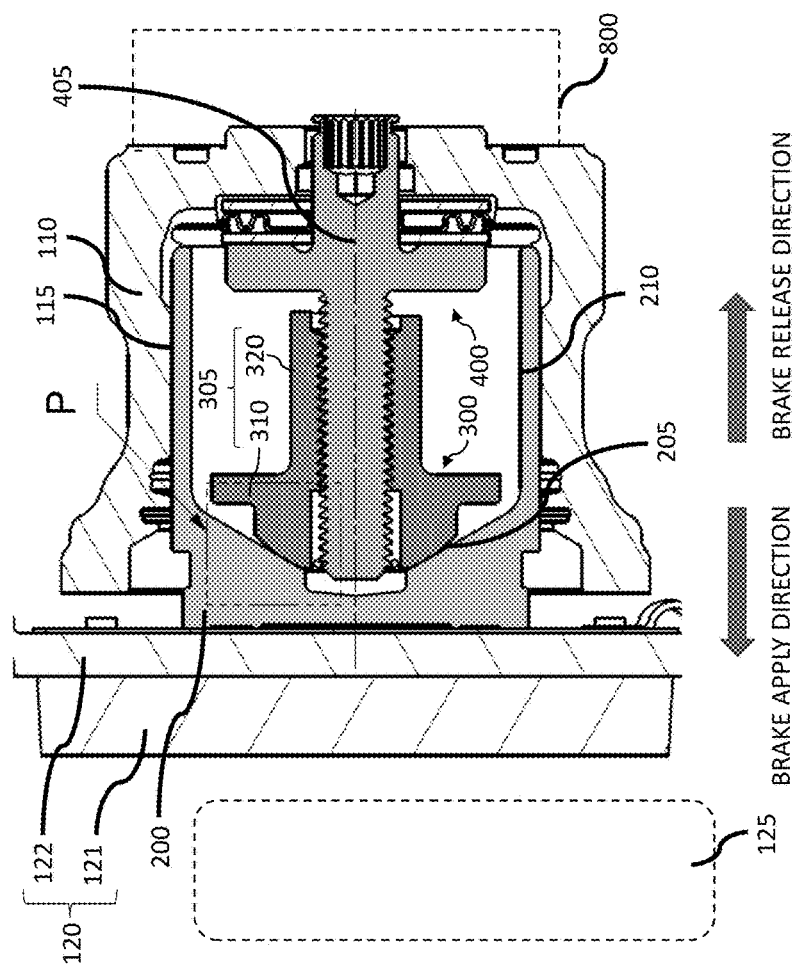
FIG. 19B
FIG. 19A

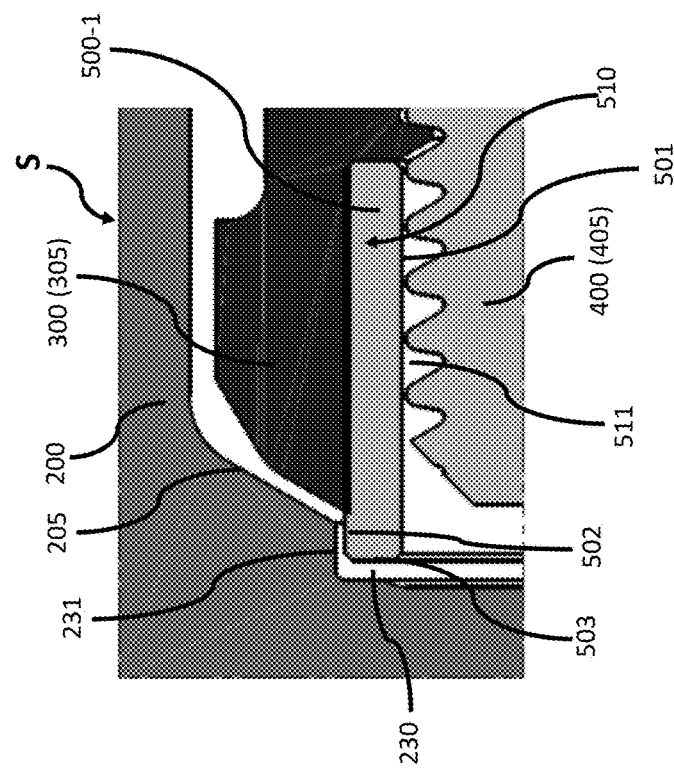
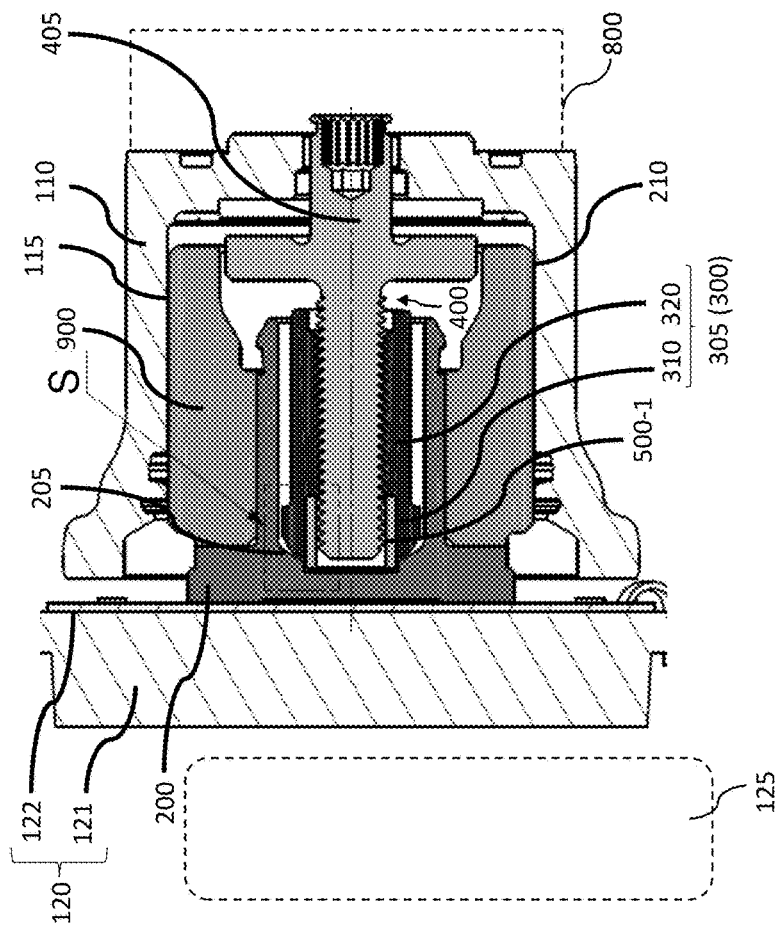
FIG. 23B
FIG. 23A

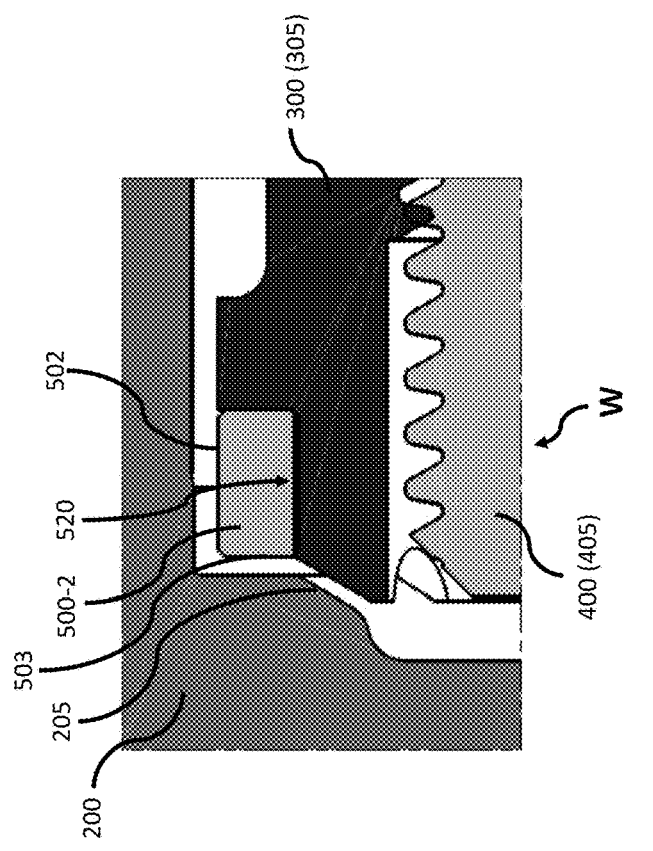
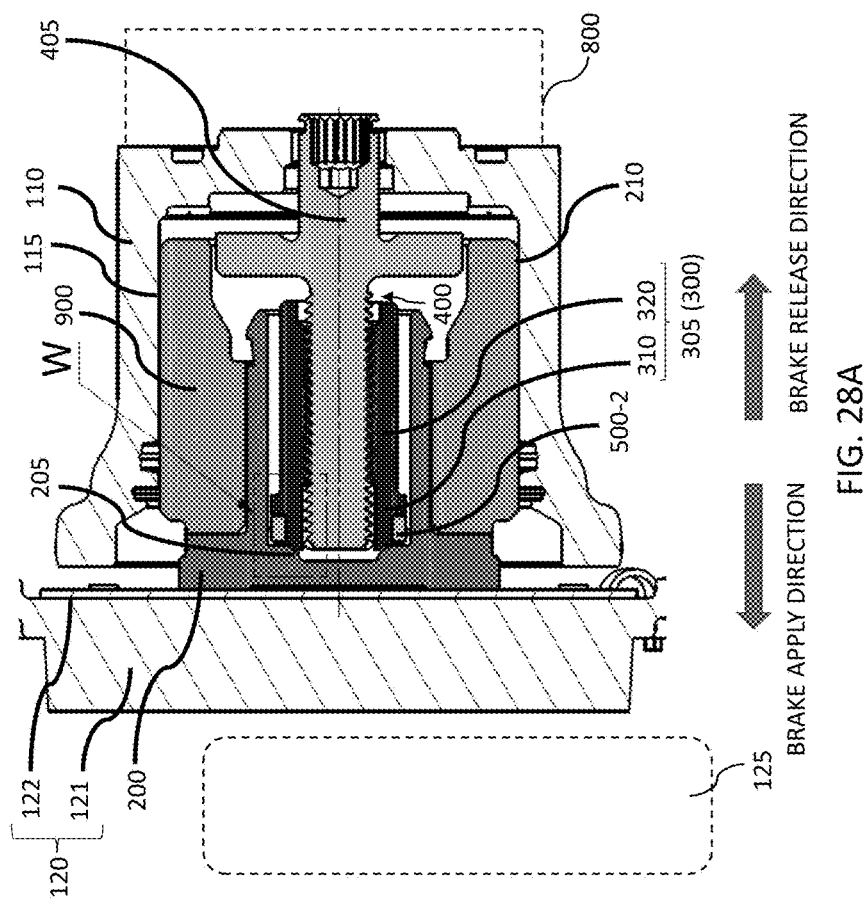
FIG. 28B
FIG. 28A

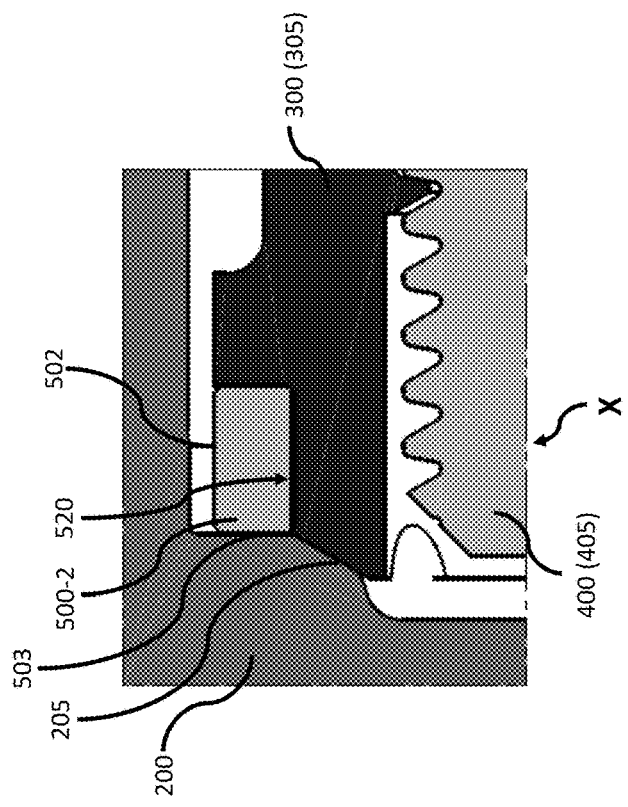
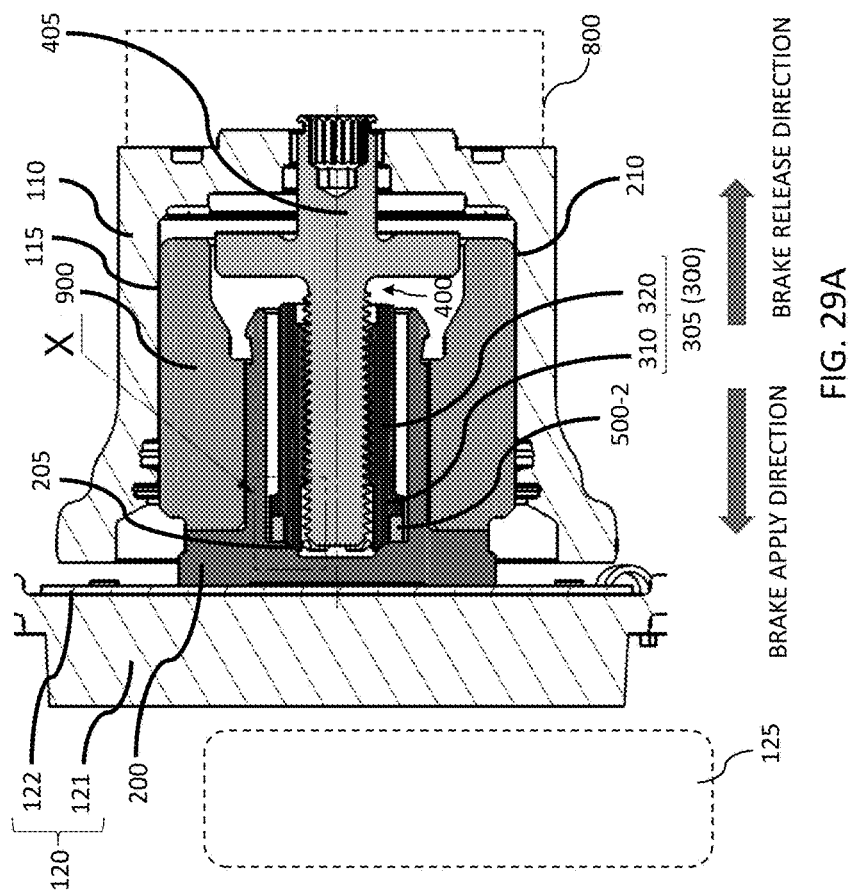
FIG. 29B
FIG. 29A

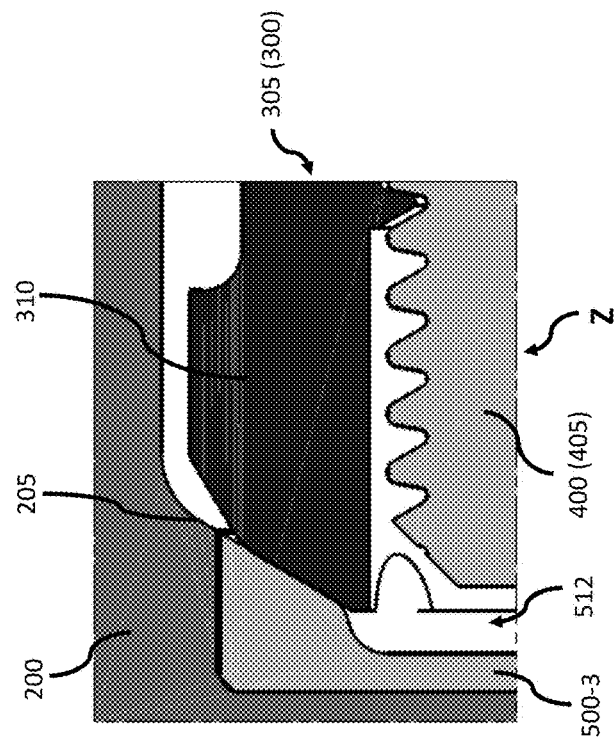
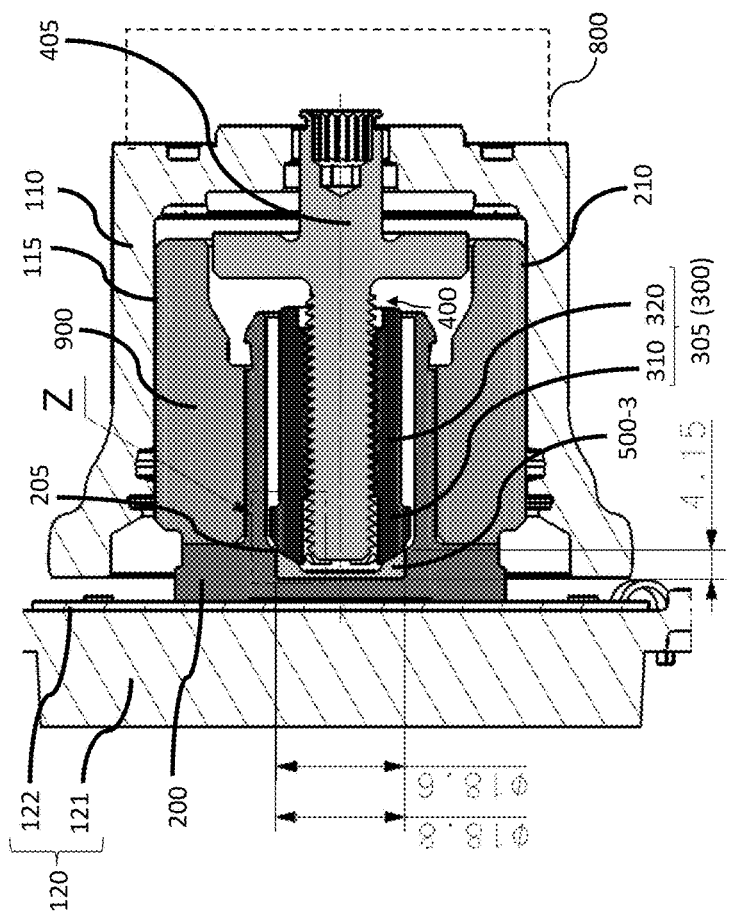
FIG. 32B
FIG. 32A

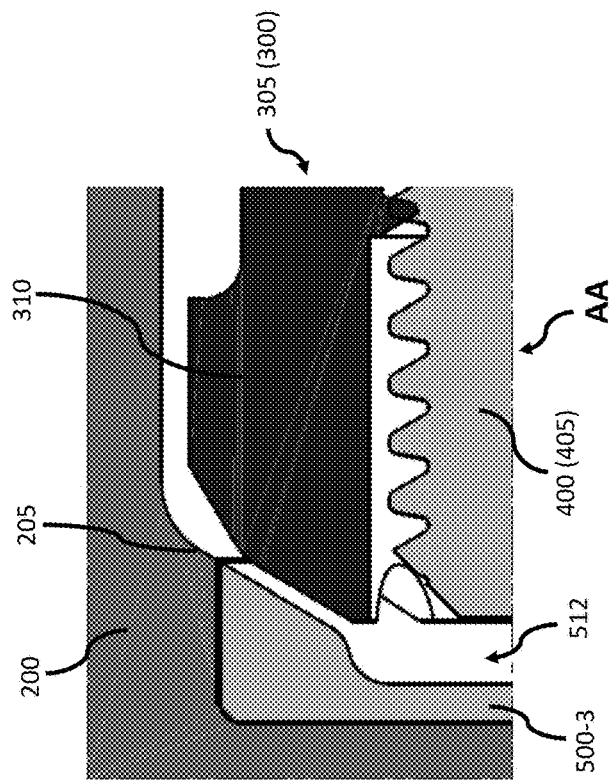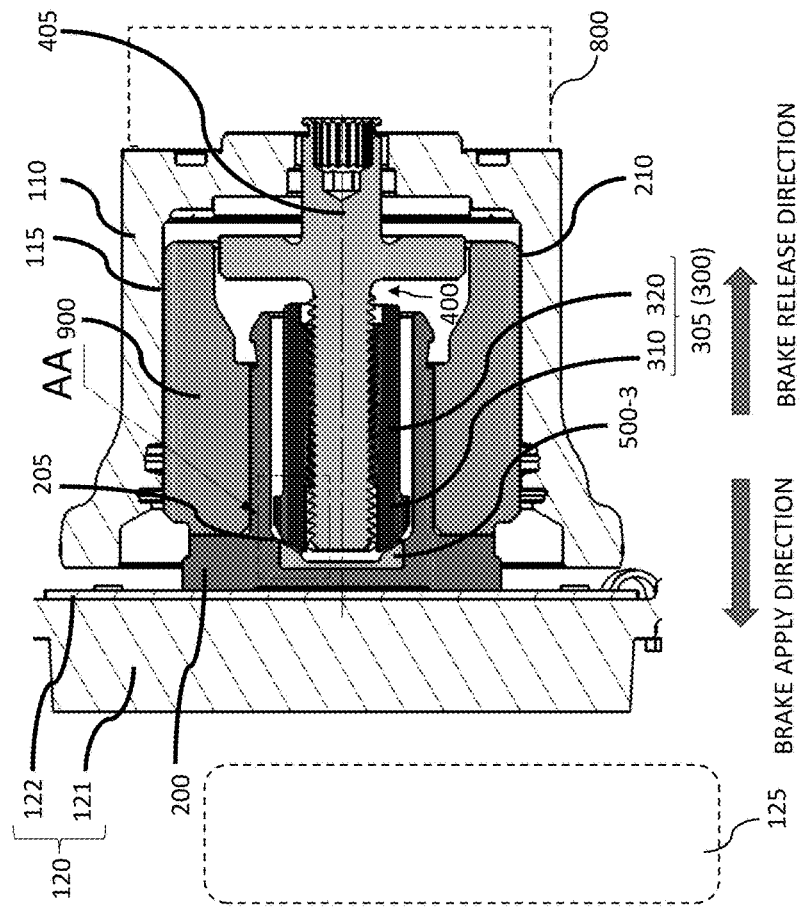
FIG. 33B
FIG. 33A

BRAKE ASSEMBLY WITH ACTIVE PISTON RETRACTION

BACKGROUND

Various embodiments of the present disclosure generally relate to brake assemblies for a vehicle and more particularly to a brake assembly having an improved structure for retracting a brake piston during a release operation of an electric parking brake.

Generally, a brake assembly may include a service brake assembly and a parking brake assembly. The service brake assembly may have a rotor, a brake caliper, and brake pads on opposing sides of the rotor. The brake caliper is slidably supported on pins secured to an anchor bracket fixed to a non-rotatable component of a vehicle, and includes one or more piston bores, each of which houses a piston that is movable along a piston axis during a brake apply and release of the brake apply. The brake pads are connected to one or more hydraulically or pneumatically actuated pistons for movement between a non-braking position and a braking position where the brake pads are moved into frictional engagement with the opposed braking surfaces of the rotor. For example, when an operation of the vehicle depresses a brake pedal, brake fluid can move the piston into contact with one brake pad and then move one brake pad into contact with one side of the rotor, while another opposing brake pad is moved into contact with an opposing side of the rotor.

When a vehicle is stopped or parked, the parking brake assembly may be used to prevent movement of the vehicle. The parking brake assembly may be a discrete assembly, or may utilize one or more components of the service brake assembly. That is, the parking brake assembly may use the piston and the brake pads of the service brake assembly to create the brake apply. For example, the parking brake assembly may move the piston, which may move the brake pads into contact with the rotor to create and maintain a brake apply by clamping force applied to the rotor.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, a brake assembly may comprise: a brake piston configured to be movable for a brake apply or release, the brake piston having an inner wall forming a piston cavity; a linearly movable structure positioned within the piston cavity of the brake piston, the linearly movable structure configured to be linearly movable within the piston cavity in response to rotation of a rotatable structure operably coupled to the linearly movable structure; and a magnet disposed between the brake piston and the linearly movable structure so that the brake piston is movable toward the linearly movable structure in response to linear movement of the linearly movable structure by magnetic field generated by the magnet.

In some exemplary embodiments of the present disclosure, the magnet may be mounted to the linearly movable structure, and the brake piston may have magnetically-attractive material attractable by the magnet so that an attractive magnetic force can be generated between the brake piston and the magnet mounted to the linearly movable structure.

In certain exemplary embodiments of the present disclosure, the magnet may be positioned in an inner groove firmed on an inner circumferential surface at an end portion of the linearly movable structure. There may be a clearance between the magnet mounted to the linearly movable structure and the rotatable structure operably coupled to the linearly movable structure. The magnet may protrude outwardly from the inner groove of the linearly moveable structure toward the inner wall of the brake piston. The inner wall of the brake piston may have a groove in which the magnet mounted to the linearly movable structure is insertable when one or both of the linearly movable structure and the brake piston approaches another or each other. There may be a clearance between an outer circumferential surface of the magnet mounted to the linearly movable structure and an inner circumferential surface of the groove of the brake piston into which the magnet mounted to the linearly movable structure is insertable. A diameter of a groove of the inner wall of the brake piston into which the magnet is insertable may be greater than a diameter of the magnet positioned in an inner groove formed on an inner circumferential surface of the linearly movable structure.

In some exemplary embodiments of the present disclosure, the magnet may be positioned in an outer groove formed on an outer circumferential surface at an end portion of the linearly movable structure. The inner wall of the brake piston may have a groove into which the magnet is insertable when one or both of the linearly movable structure and the brake piston approach another or each other. The magnet mounted to the linearly movable structure may be configured to attract the brake piston having the magnetically-attractive material.

In certain exemplary embodiments of the present disclosure, the magnet may be mounted to the inner wall of the brake piston, and the linearly movable structure may have magnetically-attractive material attractable by the magnet so that an attractive magnetic force can be generated between the linearly movable structure and the magnet mounted to the brake piston. The inner wall of the brake piston may have a groove to which the magnet is mounted.

The magnet may have a bore through which the rotatable structure is allowed to pass. Alternatively, the magnet may have a concave surface configured to receive an end portion of the rotatable structure and/or the linearly movable structure.

According to various embodiments of the present disclosure, a brake assembly may comprise: a brake piston configured to be movable for a brake apply or release, the brake piston having an inner wall forming a piston cavity; and a linearly movable structure positioned within the piston cavity of the brake piston, the linearly movable structure configured to be linearly movable within the piston cavity in response to rotation of a rotatable structure operably coupled to the linearly movable structure, wherein the linearly movable structure is magnetized and the brake piston has magnetically-attractive material attractable by magnet field generated by the magnetized linearly movable structure so that the brake piston is movable in response to linear movement of the linearly movable structure by the magnet field generated by the magnetized linearly movable structure.

According to some embodiments of We present disclosure, a brake assembly ma comprise: a brake piston configured to be movable for a brake apply or release, the brake piston having an inner wall forming a piston cavity; and a linearly movable structure positioned within the piston cavity of the brake piston, the linearly movable structure configured to be linearly movable within the piston cavity in response to rotation of a rotatable structure operably coupled to the linearly movable structure, wherein the brake piston is magnetized and the linearly movable structure has magnetically-attractive material attractable by magnet field generated by the magnetized brake piston so that the magnetized brake piston is movable in response to linear movement of the linearly movable structure by an attractive magnetic force generated between the magnetized brake piston and the linearly movable structure having the magnetically-attractive material.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which:

FIG. 3A shows a cross-sectional view of a brake assembly in a disengaged condition according to the first exemplary embodiment of the present disclosure.

FIG. 3B is an enlarged view of a square portion C shown in FIG. 3A according to the first exemplary embodiment of the present disclosure.

FIG. 4A shows a cross-sectional view of a brake assembly in an engaged condition according to the first exemplary embodiment of the present disclosure.

FIG. 4B is an enlarged view of a square portion D shown in FIG. 4A according to the first exemplary embodiment of the present disclosure.

FIG. 12A shows a cross-sectional view of a brake assembly taken at cross-section I-I of FIG. 11 according to the third exemplary embodiment of the present disclosure.

FIG. 12B is an enlarged view of a square portion J shown in FIG. 12A according to the third exemplary embodiment of the present disclosure.

FIG. 13A shows a cross-sectional view of a brake assembly in a disengaged condition according to the third exemplary embodiment of the present disclosure.

FIG. 13B is an enlarged view of a square portion K shown in FIG. 13A according to the third exemplary embodiment of the present disclosure.

FIG. 19A shows a cross-sectional view of a brake assembly in an engaged condition according to the fourth exemplary embodiment of the present disclosure.

FIG. 19B is an enlarged view of a square portion P shown in FIG. 19A according to the fourth exemplary embodiment of the present disclosure.

FIG. 23A shows a cross-sectional view of a brake assembly in a disengaged condition according to the fifth exemplary embodiment of the present disclosure.

FIG. 23B is an enlarged view of a square portion S shown in FIG. 23A according to the fifth exemplary embodiment of the present disclosure.

FIG. 28A shows a cross-sectional view of a brake assembly in a disengaged condition according to the sixth exemplary embodiment of the present disclosure.

FIG. 28B is an enlarged view of a square portion W shown in FIG. 28A according to the sixth exemplary embodiment of the present disclosure.

FIG. 29A shows a cross-sectional view of a brake assembly in an engaged condition according to the sixth exemplary embodiment of the present disclosure.

FIG. 29B is an enlarged view of a square portion X shown in FIG. 29A according to the sixth exemplary embodiment of the present disclosure.

FIG. 32A shows a cross-sectional view of a brake assembly taken at cross-section Y-Y of FIG. 31 according to the seventh exemplary embodiment of the present disclosure.

FIG. 32B is an enlarged view of a square portion Z shown in FIG. 32A according to the seventh exemplary embodiment of the present disclosure.

FIG. 33A shows a cross-sectional view of a brake assembly in a disengaged condition according to the seventh exemplary embodiment of the present disclosure.

FIG. 33B is an enlarged view of a square portion AA shown in FIG. 33A according to the seventh exemplary embodiment of the present disclosure.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

Figure 1:
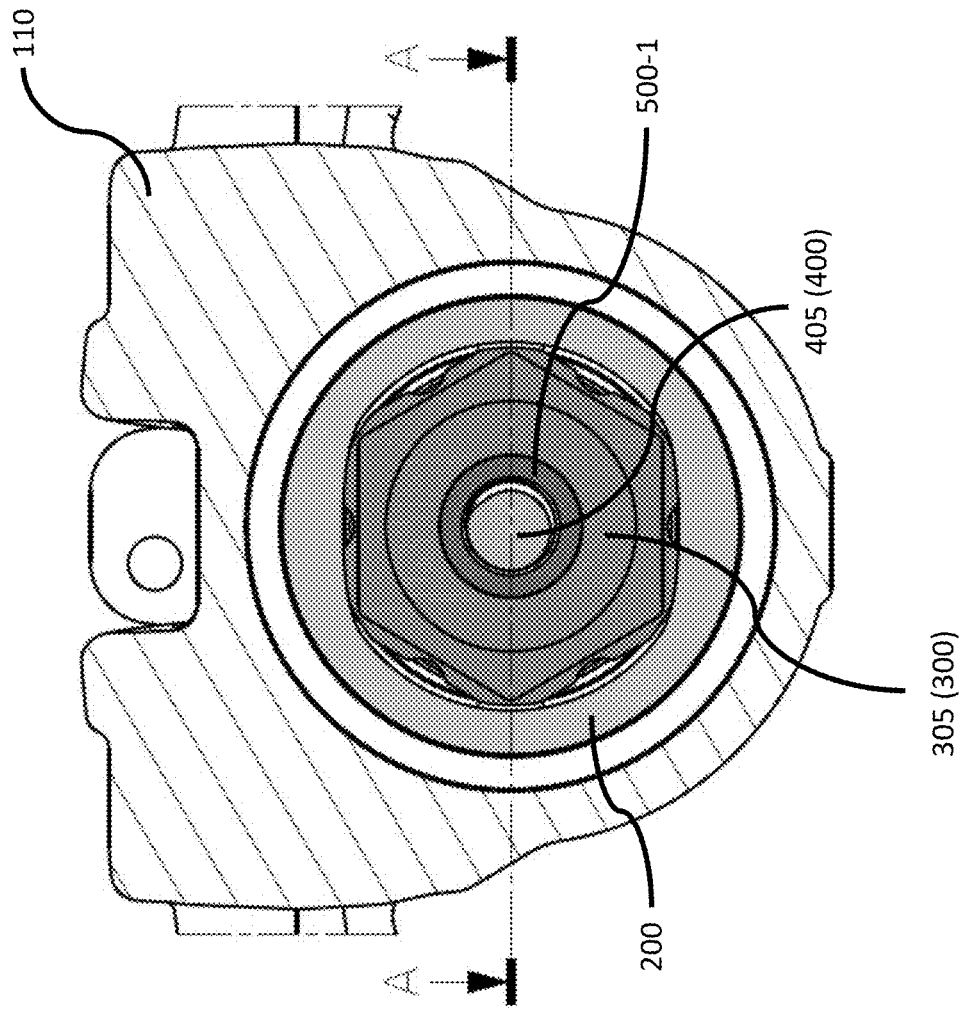
FIG. 1 illustrates a cross-sectional view of a brake assembly according to a first exemplary embodiment of the present disclosure.
Figure 2B:
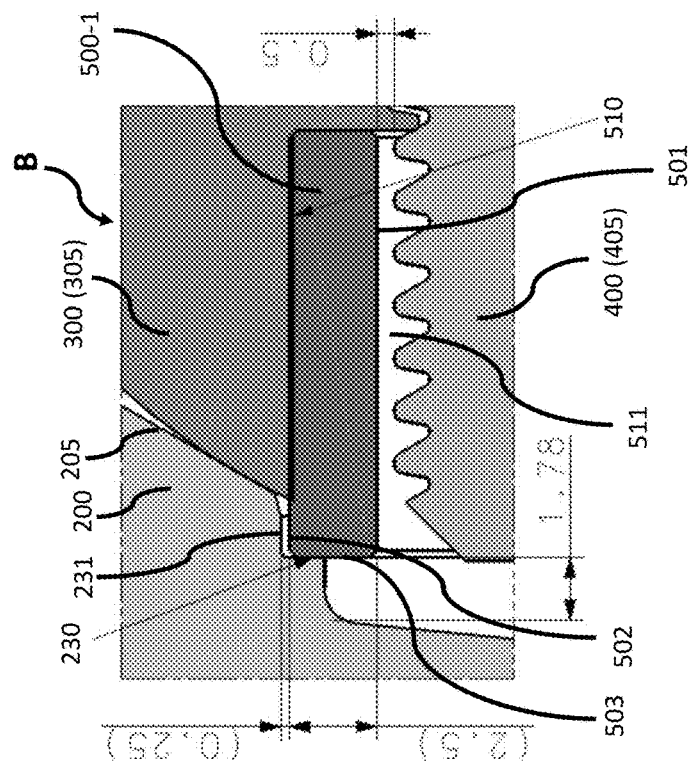
FIG. 2B is an enlarged view of a square portion B shown in FIG. 2A according to the first exemplary embodiment of the present disclosure.
Figure 2A:
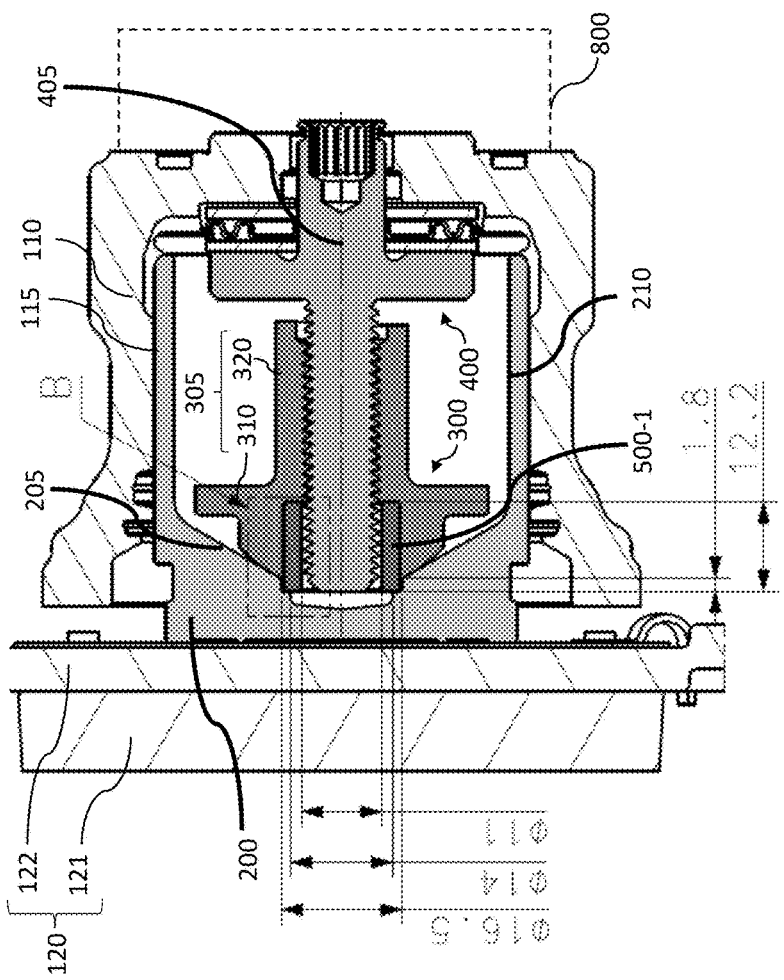
FIG. 2A shows a cross-sectional view of a brake assembly taken at cross-section A-A of FIG. 1 according to the first exemplary embodiment of the present disclosure.
Figure 5:
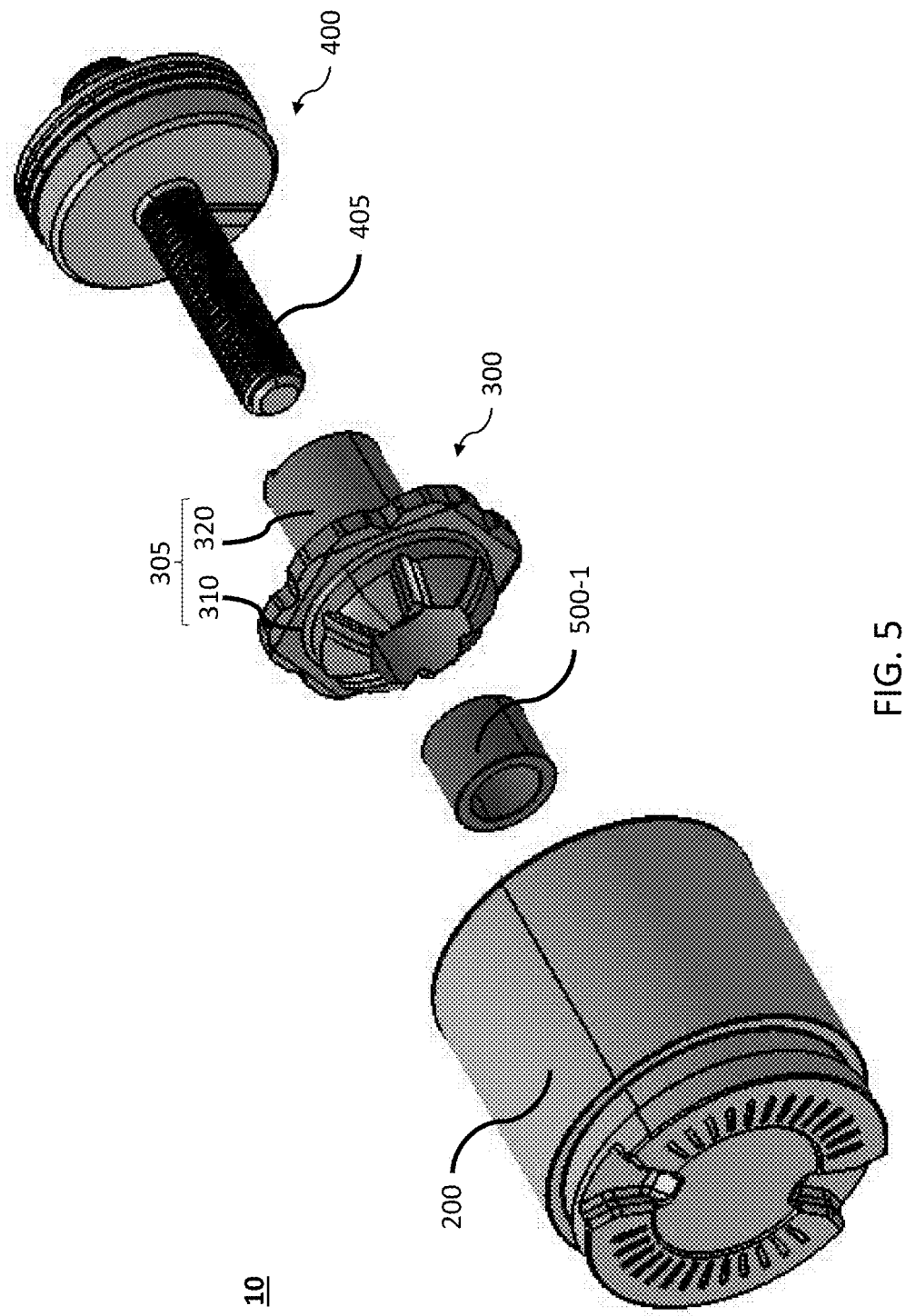
FIG. 5 is an exploded view of a brake assembly according to the first exemplary embodiment of the present disclosure.
Figure 6:
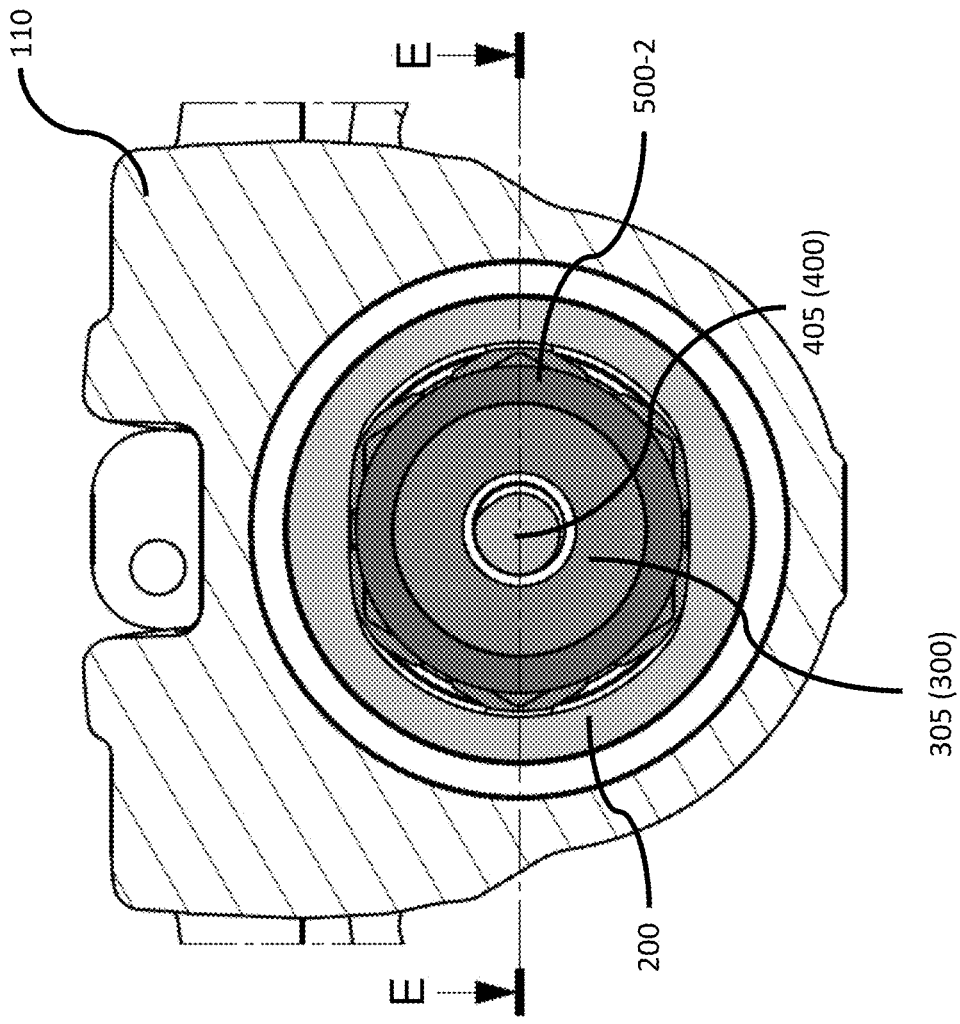
FIG. 6 illustrates a cross-sectional view of a brake assembly according to a second exemplary embodiment of the present disclosure.
Figure 7B:
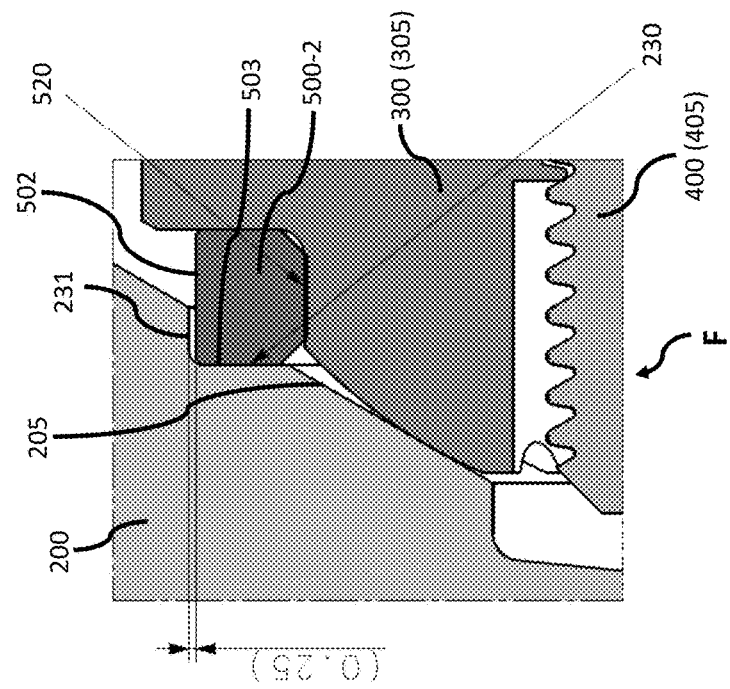
FIG. 7B is an enlarged view of a square portion F shown in FIG. 7A according to the second exemplary embodiment of the present disclosure.
Figure 7A:
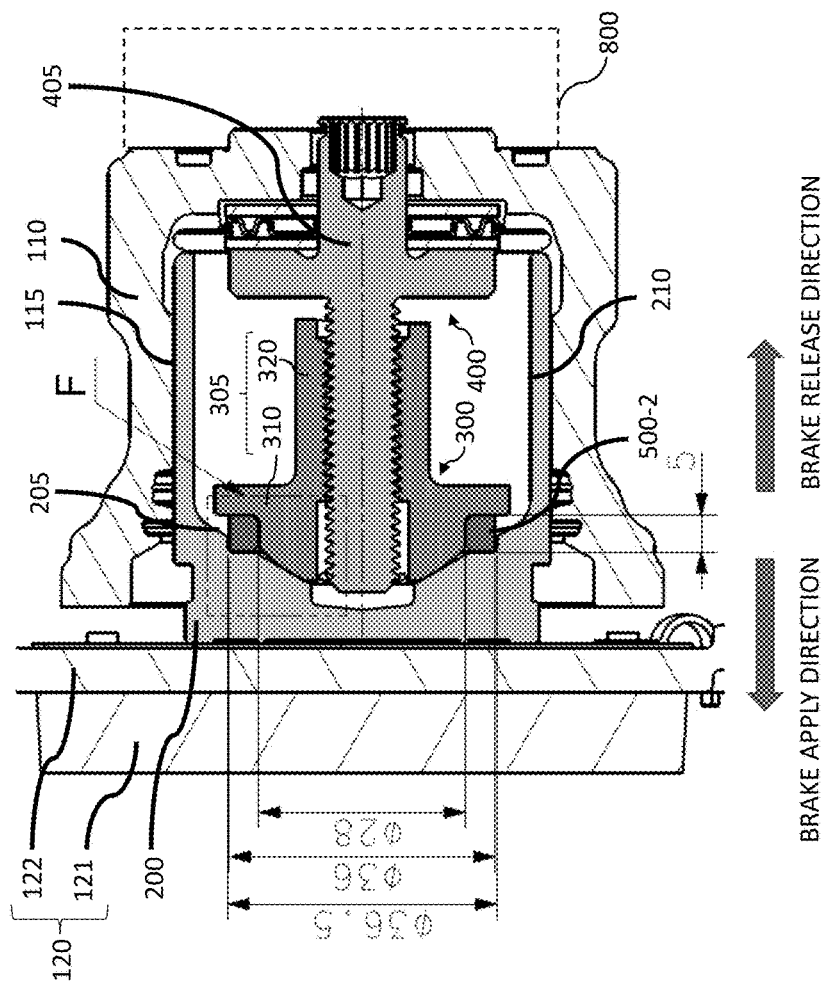
FIG. 7A shows a cross-sectional view of a brake assembly taken at cross-section E-E of FIG. 6 according to the second exemplary embodiment of the present disclosure.
Figure 8B:
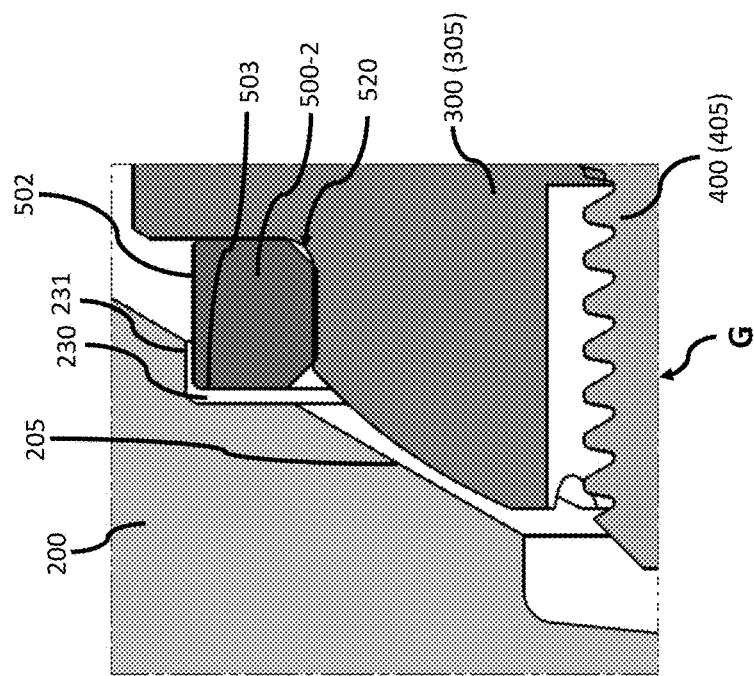
FIG. 8B is an enlarged view of a square portion G shown in FIG. 8A according to the second exemplary embodiment of the present disclosure.
Figure 8A:
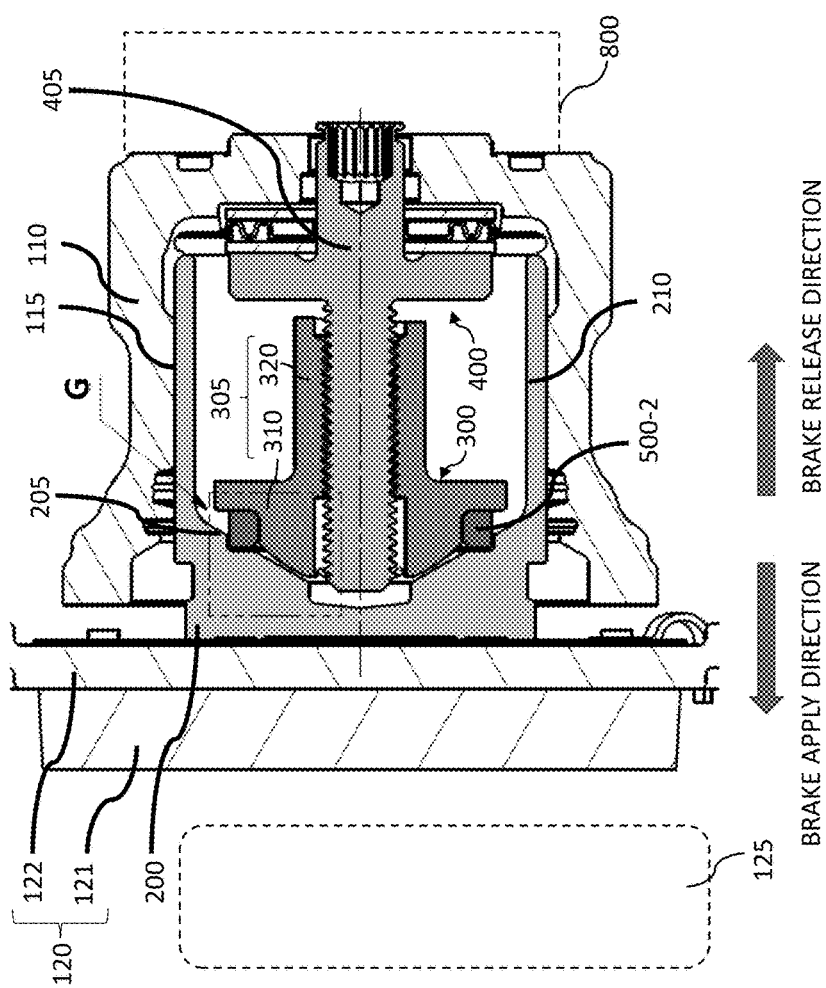
FIG. 8A shows a cross-sectional view of a brake assembly in a disengaged condition according to the second exemplary embodiment of the present disclosure.
Figure 9B:
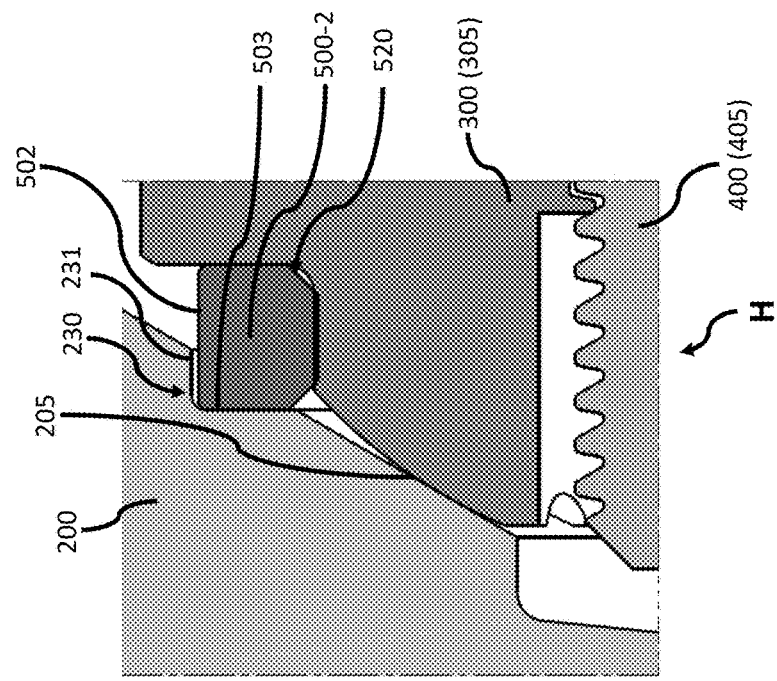
FIG. 9B is an enlarged view of a square portion H shown in FIG. 9A according to the second exemplary embodiment of the present disclosure.
Figure 9A:
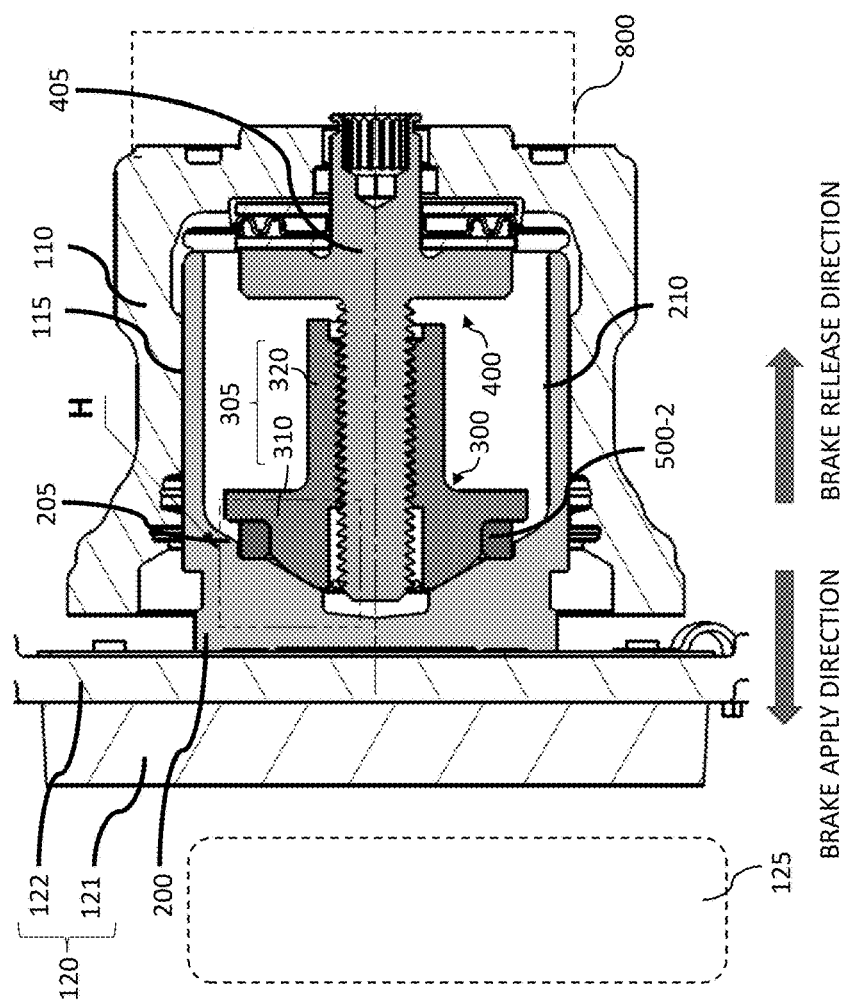
FIG. 9A shows a cross-sectional view of a brake assembly in an engaged condition according to the second exemplary embodiment of the present disclosure.
Figure 10:
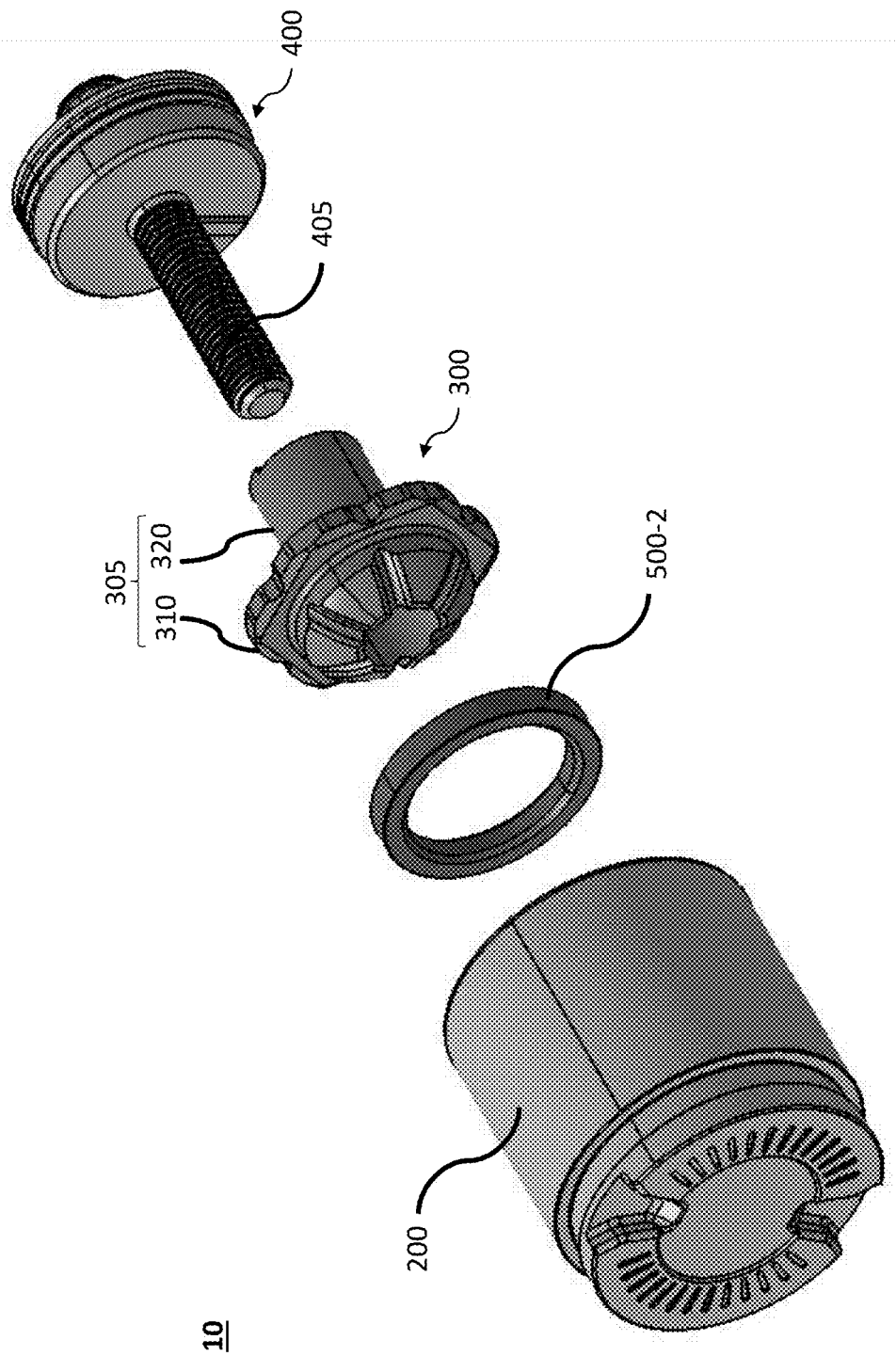
FIG. 10 is an exploded view of a brake assembly according to the second exemplary embodiment of the present disclosure.
Figure 11:
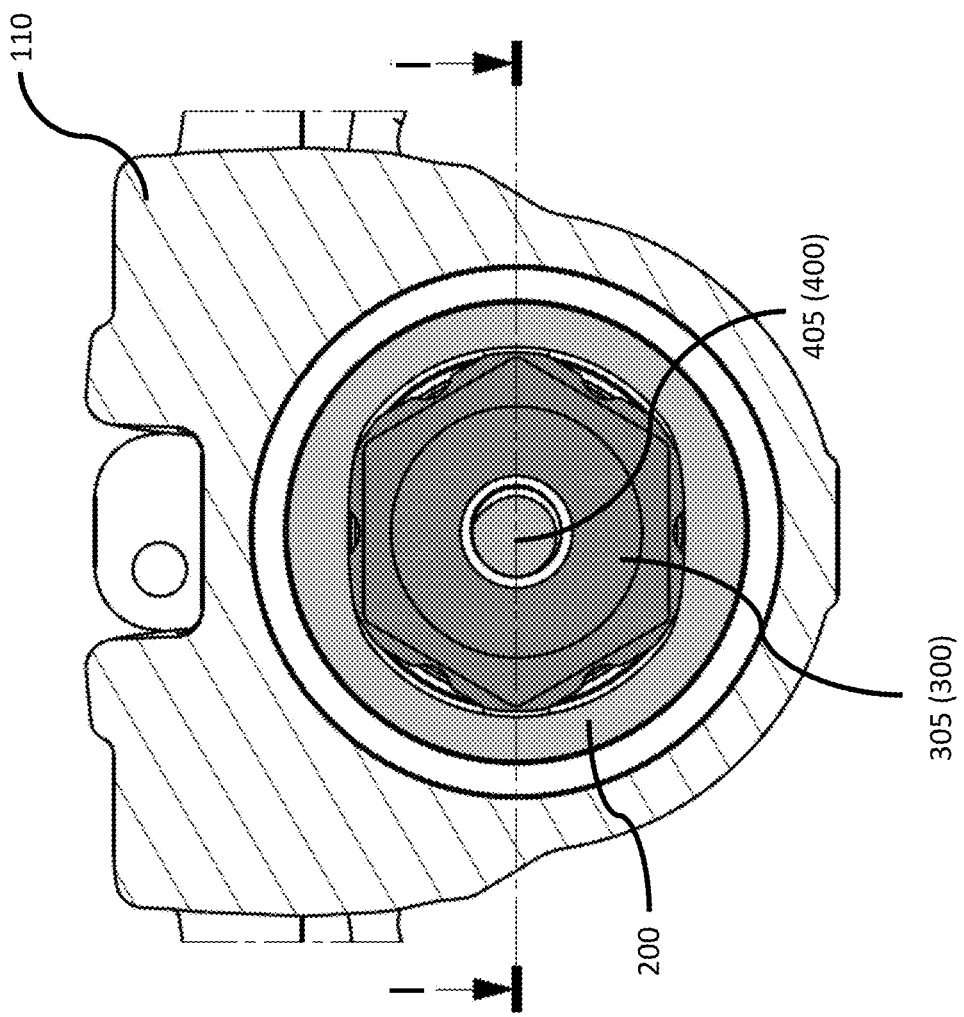
FIG. 11 illustrates a cross-sectional view of a brake assembly according to a third exemplary embodiment of the present disclosure.

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Referring to FIGS. 1 to 5, a brake assembly 10 may include a brake caliper 110. The brake caliper 110 may be mounted in a floating manner by means of a brake carrier. A brake pad assembly or brake lining assembly 120 is provided in the brake caliper 110, and includes a brake pad or lining 121 and a brake pad (or lining) carrier 122. The brake caliper 110 may include a bridge with fingers, and the fingers of the brake caliper 110 may be in contact with the brake pad carrier 122. The brake pad 121 is disposed with a small air clearance on a side of a brake rotor 125, such as a brake disc, in a release position so that no significant residual drag moment occurs. The brake pad carrier 122 is disposed between the brake pad 121 and a brake piston 200, the brake pad 121 and the brake pad carrier 122 move jointly together, and the movement of the brake pad carrier 122 causes the brake pad 121 to move with respect to the brake rotor 125. When a vehicle is in motion, the brake rotor 125 may rotate with a wheel about an axle of a vehicle. The brake caliper 110 may be connected to any non-rotating or non-moving part of a vehicle.

The brake piston 200 is mounted in a movable manner in a caliper cavity or bore 115 defined in the brake caliper 110. The caliper bore 115 can support the brake piston 200 therein. The brake piston 200 may be moved in a brake apply direction, which may function to move the brake pad 121, towards the brake rotor 125 to create the clamping force. The brake piston 200 may be moved in a brake release direction, which may function to allow the brake pad 121 to move away from the brake rotor 125 to release the clamping force.

A linearly movable structure 300 may be received in the piston cavity 210 formed by the inner wall of the brake piston 200. The linearly movable structure 300 may be configured to be linearly movable within the piston cavity 210 formed by the inner wall of the brake piston 200. For example, the linearly movable structure 300 may be operable coupled with a rotatable structure 400, and the linearly movable structure 300 is linearly movable in response to rotation of the rotatable structure 400. The linearly movable structure 300 and the rotatable structure 400 may be configured to transfer a power output from an actuator assembly 800 into a linear or axial force to move the brake piston 200 along an axis of the caliper cavity 115. The actuator assembly 800 may include, for example, but not limited to, one or more of a motor and one or more gears and/or belts for increasing a torque output of the motor.

In an exemplary embodiment of the present disclosure, the linearly movable structure 300 may include a spindle nut 305, and the rotatable structure 400 may comprise a spindle 405. The linearly movable structure 300 and the rotatable structure 400 may be operatable coupled by a threaded portion, a ball screw, a roller screw, a ball ramp, or any coupling structure or mechanism that can change the rotation movement to the linear movement.

The actuation of the actuator assembly 800 causes the spindle 405 to rotate and then the rotation of the spindle 405 causes the spindle nut 305 to be linearly moved. The motor of the actuator assembly 800 may be directly coupled to an end of the spindle 405. Alternatively, the motor of the actuator assembly 800 may be indirectly and operably coupled to the spindle 405 via one or more torque transferring mechanisms, such as gears, gear trains, and belts.

The spindle nut 305 can move axially either towards or away from the brake rotor 125. The direction that the spindle nut 305 is moved depends on the direction that the spindle 405 rotates. During a parking brake apply, the spindle 405 is rotated in an apply direction so that the spindle nut 305 is moved in a direction towards the brake rotor 125. During a parking brake release, the spindle 405 is rotated in an opposing release direction so that the spindle nut 305 is moved in a direction away from the brake rotor 125.

The spindle nut 305 has a head portion 310 which has a conical shape and can be brought into contact with a complementarily conical inner surface 205 of the brake piston 200. In a release position, there is a clearance between the head portion 310 of the spindle nut 305 and the conical inner surface 205 of the brake piston 200. The spindle nut 305 further comprises a body portion 320 extended from the head portion 310 of the spindle nut 305. An outer diameter of the head portion 310 of the spindle nut 305 may be larger than an outer diameter of the body portion 320 of the spindle nut 305.

The spindle nut 305 may threadably engage the spindle 405. For example, an outer surface of the spindle 405 may have a threaded portion and an inner surface of the spindle nut 305 may have a threaded portion that is configured to threadably engage the threaded portion of the spindle 405. Alternatively, the spindle nut 305 and the spindle 405 may be coupled to each other via a ball screw or nut, a roller screw, a ball ramp, or any rotary to linear mechanism configured to convert a rotary movement into a linear movement.

The rotation of the spindle 405 causes the spindle nut 305 to move linearly. The spindle nut 305 is restricted or prevented from rotating about an axis of the spindle 405, or about the spindle itself. As illustrated in FIG. 1, the spindle nut 305 is keyed to the piston cavity 210 of the brake piston 200 to prevent the spindle nut 305 from rotating about the spindle 405 or spindle axis.

When service braking is performed, the brake assembly 10 is hydraulically actuated. For example, the brake assembly 10 may be hydraulically actuated by a driver via a brake pedal or via a drive assistance system. When the brake assembly 10 is hydraulically actuated, hydraulic fluid is pressurized in the piston cavity 210 such that the brake piston 200 is displaced in a direction toward the brake rotor 125, and the brake pad 121 is pressed onto the brake rotor 125 by means of the brake caliper 110. However, the spindle nut 300 remains unactuated, and therefore remains at an initial axial position. During the service braking application, the fluid may be pressurized, which may function to exert a fluid pressure force or a pressing force on the brake piston 200. The fluid pressure force or the pressing force may move the brake piston 200 in the apply direction towards the brake pad 121. The pressurized fluid pressure or the pressing force applied on the brake piston 200 in turn exerts a force onto the brake pad carrier 122.

Operation of parking brake of the brake assembly 10 will now be described. It is understood that these operations or method steps can be performed in virtually any order, and one or more of the operations or steps described herein may be changed, combined, omitted or repeated.

For activating parking brake, a signal may be transmitted by an electronic control unit (ECU) or a controller to the actuator assembly 800 to apply the parking brake. In response to the signal of the ECU, the actuator assembly 800 provides torque to the spindle 405 in the brake apply direction so that the rotation force provided by the actuator assembly 800 can cause the spindle 405 to rotate in the apply direction and then the rotation of the spindle 405 can cause the spindle nut 305 to be advanced or linearly moved in a direction toward the brake rotor 125 and then the head portion 310 of the spindle nut 300 to contact and support the inner wall of the brake piston 200 (e.g. the conical inner surface 205) until the clearance between the brake pad 121 and the brake rotor 125 is removed. The continued rotation of the spindle 405 and thus linear movement of the spindle nut 305 to move the brake piston 200 and the brake pad 121 against the brake rotor 125 to generate the clamping force necessary to prevent movement of the vehicle.

Eventually, a forward or leading end of the spindle nut 305 may contact an end inner wall of the piston cavity 210. After the contact is made between the forward or leading end of the spindle nut 305 and the end inner wall of the piston cavity 210, continued rotation of the spindle 405 in the apply direction, and thus continued linear movement of the spindle nut 305 in the apply direction, causes the brake piston 200 to be pushed or moved in the apply direction towards the brake pad 121. Continued movement of the brake piston in the apply direction eventually causes the brake piston 200 to move or push the brake pad 121 against the brake rotor 125 to create friction or a clamping force.

As a result, the position of the brake piston 200 is fixed in a parking brake state by the support of the spindle nut 305. Once the brake piston 200 is supported by the spindle nut 305, the hydraulic pressure in the piston cavity 210 may be removed. The parking brake state is maintained by the spindle nut 300 because of self-locking between the spindle nut 300 and the spindle 400. The brake pad 121 pressing against the brake rotor 125 is supported via the spindle nut 300.

To release the parking brake, the ECU or controller may transmit a signal for the parking brake release to the actuator assembly 800. In response to the signal for the parking brake release, the actuator assembly 800 provides rotation force to the spindle 405 in an opposing direction or brake release direction, which is opposite to the direction that the spindle is rotated when the spindle is rotated in the apply direction, which causes the spindle 405 to rotate in the opposing direction or brake release direction and then the spindle nut 305 to move axially in the brake release direction or a direction away from the brake rotor 125. The linear movement of the spindle nut 305 in the brake release direction may make the brake piston 200 free to relax and move away from the brake pad 121 so that the brake pad 121 can move away from the brake rotor 125 to release the clamping force.

When the parking brake state is released, pressurized hydraulic fluid is introduced into the brake cavity 210. As a result, the brake piston 200 is displaced slightly toward the brake rotor 125 such that the spindle nut 305 can be relieved of axial load. Through the control of the actuator assembly 800, the spindle nut 305 can be retracted in a direction away from the brake rotor 125 into the initial position.

The rotation of the spindle 405 in the release direction causes the spindle nut 305 to move linearly or axially in the release direction, or away from the end inner wall 205 of the brake piston 200. The brake piston 200 can then move back into the caliper cavity 115 out of contact with the brake carrier 122, thus allowing the brake pad 121 to move out of contact with the brake rotor 125 to release the clamping force.

A magnet 500 may be positioned between the brake piston 200 and the linearly movable structure 300 (e.g. the spindle nut 305) to retract the brake piston 200 in the brake release direction during the brake release operation. The magnet 500 can pull the brake piston 200 into the brake release position. The magnet 500 may be configured to generate magnetic field so that the brake piston 200 can be moved toward the linearly movable structure 300 (e.g. the spindle nut 305) by the magnetic field generated by the magnet 500. The magnetic field strength generated by the magnet 500 may be sufficiently high for moving the brake piston 200. The magnet 500 may provide a sufficient attraction force to move the brake piston 200 when the magnet 500 and the brake piston 200 are brought in sufficiently close proximity to each other. Accordingly, as the linearly movable structure 300 (e.g. the spindle nut 305) moves in the brake release direction, the magnet 500 positioned between the brake piston 200 and the linearly movable structure 300 (e.g. the spindle nut 305) can move the brake piston 200 toward the linearly movable structure 300 (e.g. the spindle nut 305), thereby retracting the brake piston 200 in the brake release direction. The magnet 500 may function to provide active retraction of the brake piston 200 when the linearly movable structure 300 (e.g. the spindle nut 305) moves in the brake release direction during the brake release operation.

The magnet 500 may include one or more of magnetic metallic elements (e.g., iron, cobalt, nickel, etc.), composite magnets (e.g., ceramic or ferrite magnets, alnico magnets, ticonal magnets, injection molded magnets, flexible magnets), rare earth magnets (e.g., samarium-cobalt magnets, neodymium-iron-boron magnets, etc.), Neodymium magnets, sets of any of these magnets, or any material or composition that produces a magnetic field. The magnet may be preferably a permanent magnet or the like. Alternatively, the magnet 500 can be an electro-magnet. Further, the magnet 500 may be replaced with a magnetized material, such as, but not limited to, a ferrous material including an iron, cobalt, nickel, steel, rare earth metal or their alloys, or the like.

The magnet 500 may be arranged in a location to magnetically interact with the brake piston 200 or the linearly movable structure 300 (e.g. the spindle nut 305) when the magnet 500 and the brake piston 200 (or the linearly movable structure 300 (e.g. the spindle nut 305)) are in relative close proximity to each other. The magnet 500 may be mounted to various positions of the linearly movable structure 300 (e.g. the spindle nut 305) and/or the brake piston 200. For example, as in the first exemplary embodiment illustrated in FIGS. 1 to 5 and the second exemplary embodiment shown in FIGS. 6 to 10, the magnet 500 can be arranged in a fixed relation to the linearly movable structure 300 (e.g. the spindle nut 305), for example, by attaching the magnet 500 (e.g. magnet 500-1 of FIG. 1 to 5 or 500-2 of FIGS. 6 to 10) to a suitable location on a wall or on other structure of or in the linearly movable structure 300 (e.g. the spindle nut 305). Alternatively, as in the third exemplary embodiment illustrated in FIGS. 11 to 15, the magnet 500 can be arranged in a fixed relation to the brake piston 200, for example, by attaching the magnet 500 (e.g. magnet 500-3 of FIGS. 11 to 15) to a suitable location on a wall or on other structure of or in the brake piston 200. Further, in another exemplary embodiment, the magnet 500 can be mounted to both the brake piston 200 and the linearly movable structure 300 to increase the strength of an attracting force moving the brake piston 200.

First Exemplary Embodiment (FIGS. 1 to 5)

Referring to FIGS. 1 to 5, in the first exemplary embodiment, the magnet 500-1 may be fixed to the linearly movable structure 300 (e.g. the spindle nut 305) such that the magnet 500-1 can be moved together with the linearly movable structure 300 (e.g. the spindle nut 305), while the brake piston 200 may have magnetically-attractive material attractable by the magnet 500-1, Accordingly, the attractive magnetic force can be generated between the magnet 500-1 mounted to the linearly movable structure 300 and the brake piston 200 having the magnetically-attractive material when the magnet 500-1 and the brake piston 200 are in relative close proximity to each other, and therefore the magnet 500-1 mounted to the linearly movable structure 300 may attract or pull the brake piston 200 having the magnetically-attractive material. The magnetically-attractive material of the brake piston 200 may include, for example, but not limited to, one or more of a ferromagnetic material, a paramagnetic material, or a magnetized material. The ferromagnetic material may include iron, nickel and cobalt and their alloys. For instance, the brake piston 200 is made of steel (e.g. low-carbon steel). However, the brake piston 200 can comprise, or be made of, any material which can be magnetically attracted by the magnet 500-1. Further, the brake piston 200 may include an additional magnet to magnetically interact with the magnet 500-1.

In the first exemplary embodiment, the magnet 500-1 may be positioned in an inner groove 510 formed on an inner circumferential surface of the linearly movable structure 300 (e.g. the spindle nut 305). For example, the inner groove 510 is formed at the head portion 310 of the spindle nut 305, for instance, but not limited to, an end portion of the spindle nut 305 facing the end inner surface 205 of the brake piston 200. The magnet 500-1 may be press-fitted in the inner groove 510 of the spindle nut 305. Alternatively, the magnet 500-1 may be attached to the inner groove 510 of the spindle nut 305 using an adhesive, bolts, rivets, or other attachment mechanisms.

The magnet 500-1 may be formed in a hollow cylinder shape, a ring shape, or a disc shape. The outer or inner circumferential surface of the magnet 500-1 may have at least one of circular-shaped, square-shaped (such as square-cuts, lathe cuts, tabular cut or square rings), or polygon-shaped cross-section and a combination thereof. However, the magnet 500-1 may have any shape which can be fit in the inner groove 510 of the linearly movable structure 300 (e.g. the spindle nut 305), for instance, a shape of a nut. The magnet 500-1 may have a bore 511 at its center so that the spindle 405 is allowed to pass through the bore 511 of the magnet 500-1. The clearance is provided between the inner surface 501 of the bore 511 of the magnet 500-1 and the outer circumferential surface of the spindle nut 305 so that the magnet 500-1 and the spindle nut 305 cannot be contacted with each other.

A groove 230 corresponding to the magnet 500-1 mounted on the inner circumferential surface of the spindle nut 305 may be formed on the end inner wall 205 of the brake piston 200. The magnet 500-1 mounted to the linearly movable structure 300 (e.g. the spindle nut 305) is insertable into the groove 230 of the brake piston 200 when the linearly movable structure 300 (e.g. the spindle nut 305) and the brake piston 200 approach each oiler. There may be a gap or clearance between the outer surface 502 of the magnet 500-1 and an inner circumferential surface 231 of the groove 230 of the brake piston 200. For example, a diameter of the groove 230 of the inner wall 210 of the brake piston 200 is greater than a diameter of the magnet 500-1 positioned in the inner groove 510 formed on an inner circumferential surface of the linearly movable structure 300 so that the magnet 500-1 mounted to the linearly movable structure 300 can be inserted into the groove 230 of the brake piston 200 when one of the brake piston 200 and the linearly movable structure 300 approaches the other of the brake piston 200 and the linearly movable structure 300. The magnet 500-1 may protrude outwardly from the inner groove 510 of the linearly movable structure 300 toward the inner wall 205 of the brake piston 200. An end side 503 of the magnet 500-1 may contact a part of the groove 230 of the brake piston 200 when the head portion 310 of the spindle nut 305 engages with the end inner surface 205 of the brake piston 200. Alternatively, the magnet 500-1 may not contact the brake piston 200 even when the head portion 310 of the spindle nut 305 engages with the inner surface 205 of the brake piston 200 in order to reduce the noise caused by the contact between the magnet 500-1 and the brake piston 200.

In operation, when the parking brake is in the brake apply position, the brake piston 200 is pushed by the linearly movable structure 300 (e.g. the spindle nut 305) and is in direct or indirect contact with the brake pad assembly 120 to maintain the clamping force of the brake pad assembly 120 against the brake rotor 125. However, when the operation of releasing the parking brake is initiated, the spindle nut 305 is retracted in a brake release direction away from brake rotor 125 in response to the rotation of the spindle 405, and then this linear movement of the spindle nut 305 in the brake release direction may make the inner surface 205 of the brake piston 200 disengaged from the head portion 310 of the spindle nut 305 as shown in FIGS. 3A and 3B. Then, the brake piston 200 having the magnetically-attractive material is pulled toward the linearly movable structure 300 (e.g. the spindle nut 305) by the attractive magnetic force generated between the brake piston 200 and the magnet 500-1 mounted to the linearly movable structure 300 so that the retraction of the brake piston 200 can cause the inner surface 205 of the brake piston 200 to be engaged with the magnet 500-1 and/or the head portion 310 of the spindle nut 305 as illustrated in FIGS. 4A and 4B, and therefore the brake piston 200 can be retracted together with the linearly movable structure 300 (e.g. the spindle nut 305). Accordingly, upon brake release, the brake piston 200 is forced back and retracted by the attractive magnetic force generated between the brake piston 200 having the magnetically-attractive material and the magnet 500-1 mounted to the linearly movable structure 300. Thus, the magnet 500-1 advantageously assists in retracting the brake piston 200 having the magnetically-attractive material to pull the brake piston 200 to a pre-apply position and maintain a constant and repeatable air gap between the brake piston 200 and the brake rotor 125. The magnet 500-1 attached to the linearly movable structure 300 can retract the brake piston 200 having the magnetically-attractive material actively when the spindle nut 305 moves in the brake release direction. The brake drag caused by contact forces between the brake pad assembly 120 and the brake rotor 125 due to insufficient retraction distance of the brake piston 200 during the brake release operation can be prevented, and therefore the brake piston retraction is improved.

Second Exemplary Embodiment (FIGS. 6 to 10)

In the first exemplary embodiment of FIGS. 1 to 5 described above, the magnet 500-1 is disposed on the inner circumferential surface of the linearly movable structure 300 (e.g. the spindle nut 305). However, as illustrated in the second exemplary embodiment of FIGS. 6 to 10, a magnet 500-2 can be mounted on an outer circumferential surface of the linearly movable structure 300 (e.g. the spindle nut 305) instead of the inner circumferential surface of the linearly movable structure 300.

Referring to FIGS. 6 to 10, in the second exemplary embodiment, the magnet 500-2 may be fixed to the linearly movable structure 300 (e.g. the spindle nut 305), while the brake piston 200 may have magnetically-attractive material attractable by the magnet 500-2. Accordingly, the attractive magnetic force can be generated between the magnet 500-2 mounted to the linearly movable structure 300 and the brake piston 200 having the magnetically-attractive material when the magnet 500-2 and the brake piston 200 are in relative close proximity to each other, and therefore the magnet 500-2 mounted to the linearly movable structure 300 may attract or pull the brake piston 200 having the magnetically-attractive material. The magnetically-attractive material of the brake piston 200 may include, for example, but not limited to, one or more of a ferromagnetic material, a paramagnetic material, or a magnetized material. The ferromagnetic material may include iron, nickel and cobalt and their alloys. For instance, the brake piston 200 is made of steel (e.g. low-carbon steel). However, the brake piston 200 can comprise, or be made of, any material which can be magnetically attracted by the magnet 500-2. Further, the brake piston 200 may include an additional magnet to magnetically interact with the magnet 500-1.

The magnet 500-2 may be positioned in an outer groove 520 formed on the outer circumferential surface of the linearly movable structure 300 (e.g. the spindle nut 305). For example, the outer groove 520 is formed on an outer surface of the head portion 310 of the spindle nut 305, for instance, but not limited to, an end portion of the spindle nut 305 facing the end inner surface 205 of the brake piston 200. The magnet 500-2 may be press-fitted in the outer groove 520 of the spindle nut 305. Alternatively, the magnet 500-2 may be attached to the outer groove 520 of the spindle nut 305 using an adhesive, bolts, rivets, or other attachment mechanisms.

Figure 30:
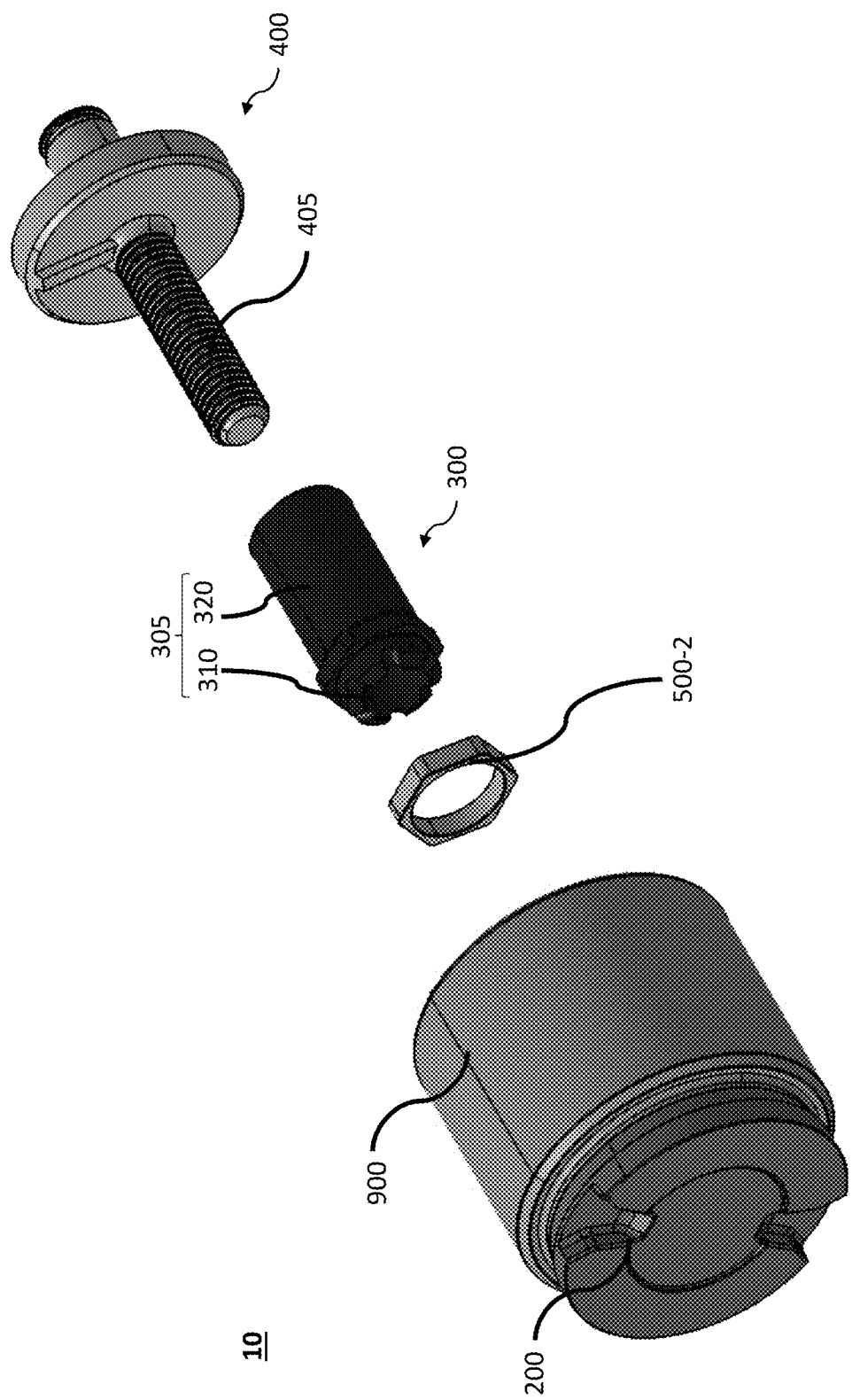
FIG. 30 is an exploded view of a brake assembly according to the sixth exemplary embodiment of the present disclosure.
Figure 31:
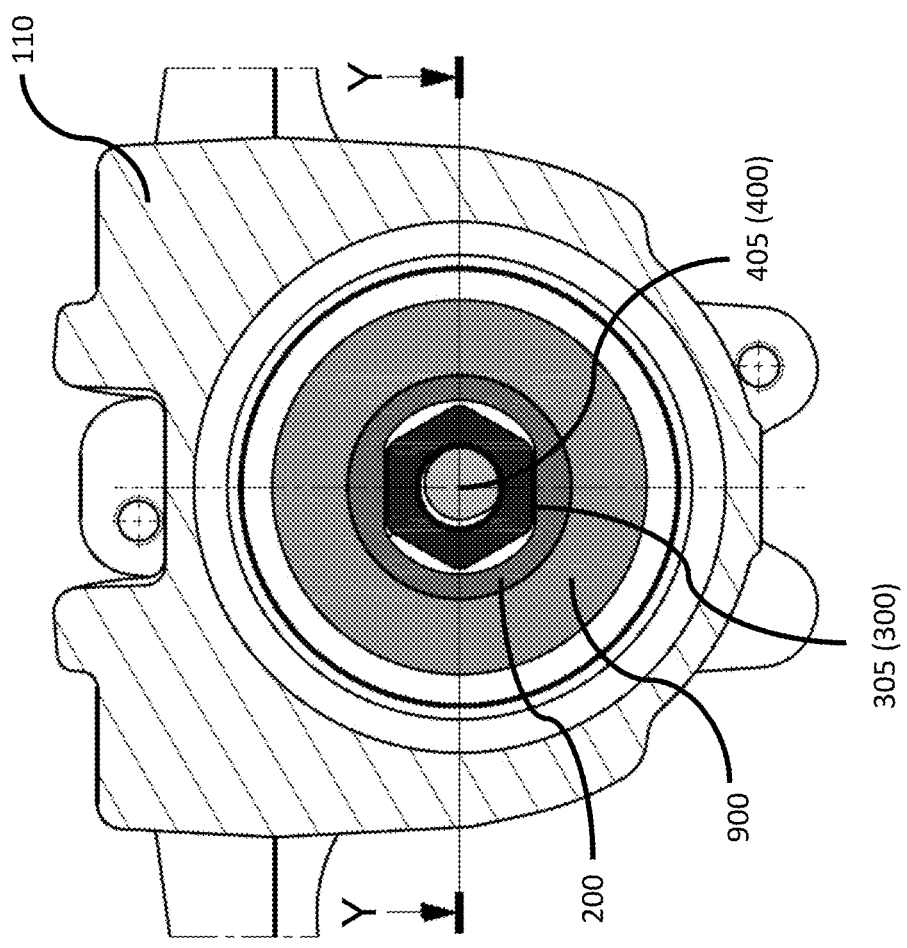
FIG. 31 illustrates a cross-sectional view of a brake assembly according to a seventh exemplary embodiment of the present disclosure.
Figure 34B:
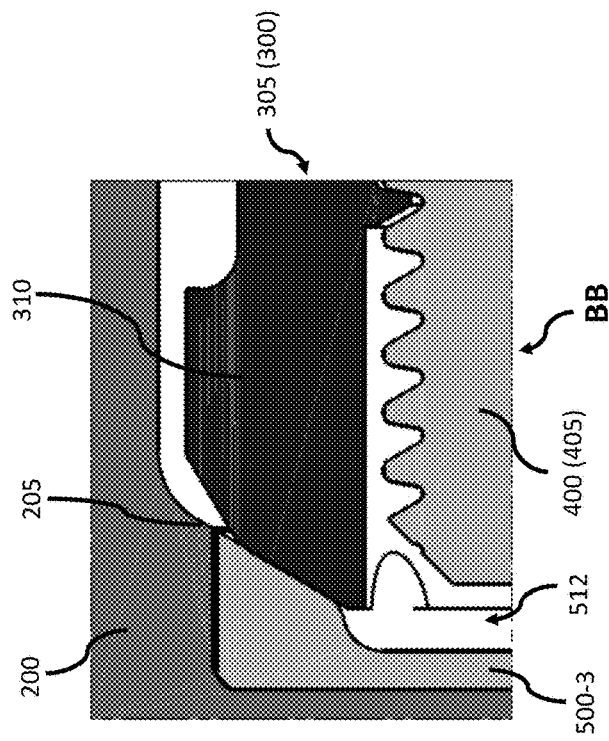
FIG. 34B is an enlarged view of a square portion BB shown in FIG. 34A according to the seventh exemplary embodiment of the present disclosure.
Figure 34A:
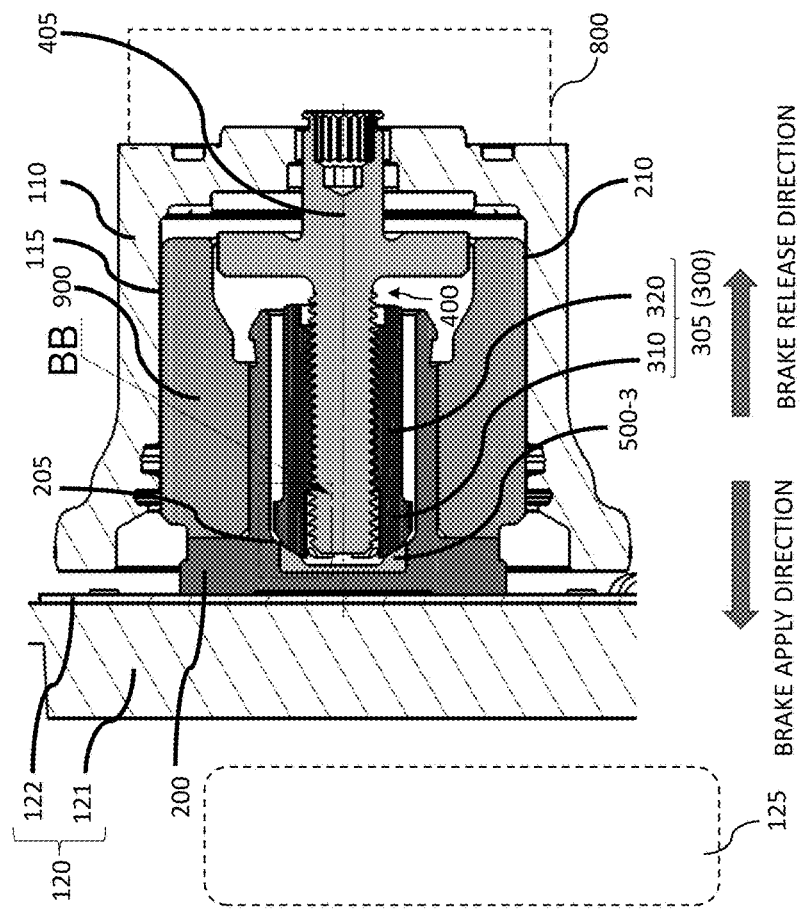
FIG. 34A shows a cross-sectional view of a brake assembly in an engaged condition according to the seventh exemplary embodiment of the present disclosure.
Figure 35:
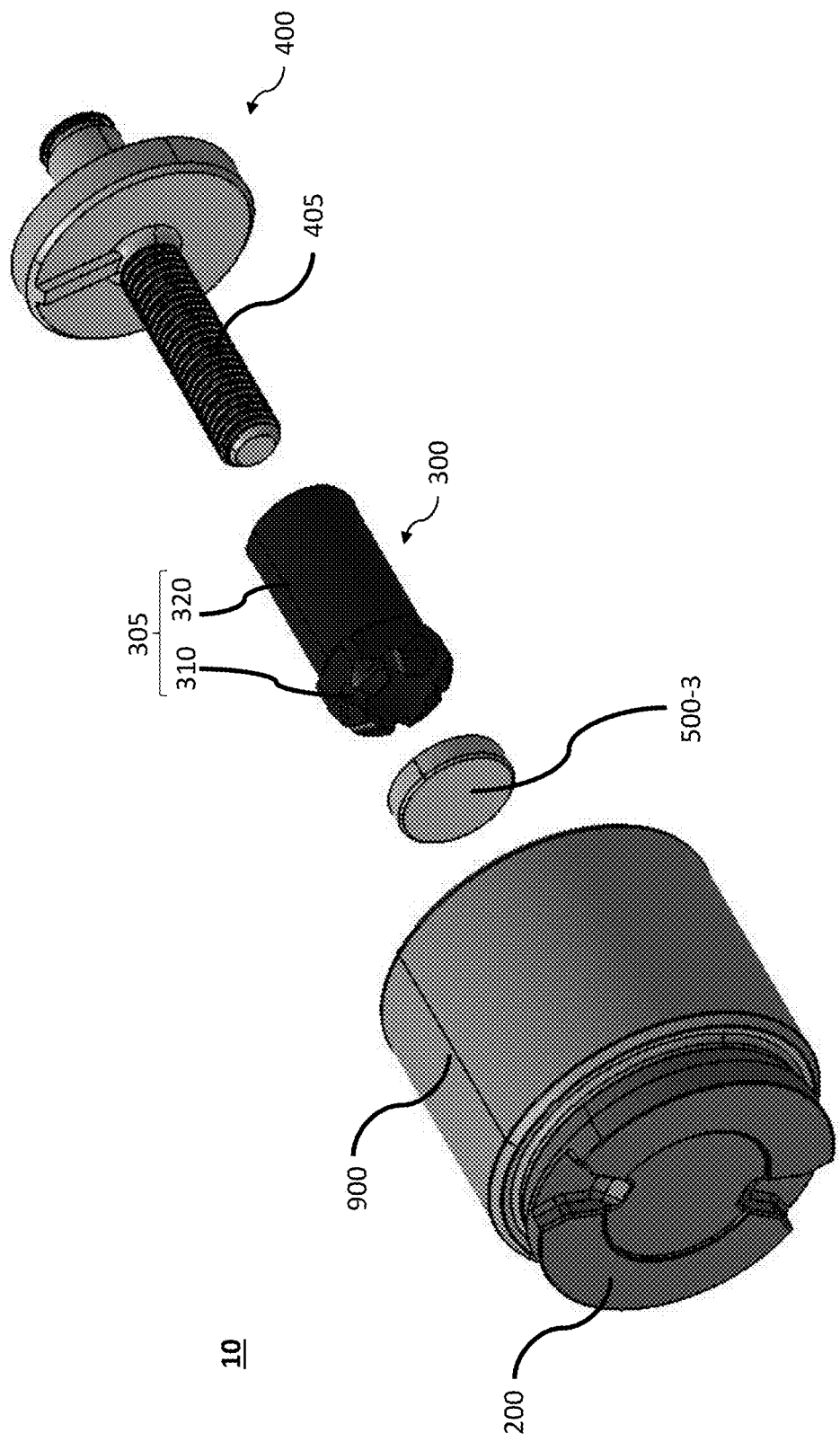
FIG. 35 is an exploded view of a brake assembly according to the seventh exemplary embodiment of the present disclosure.
Figure 36:
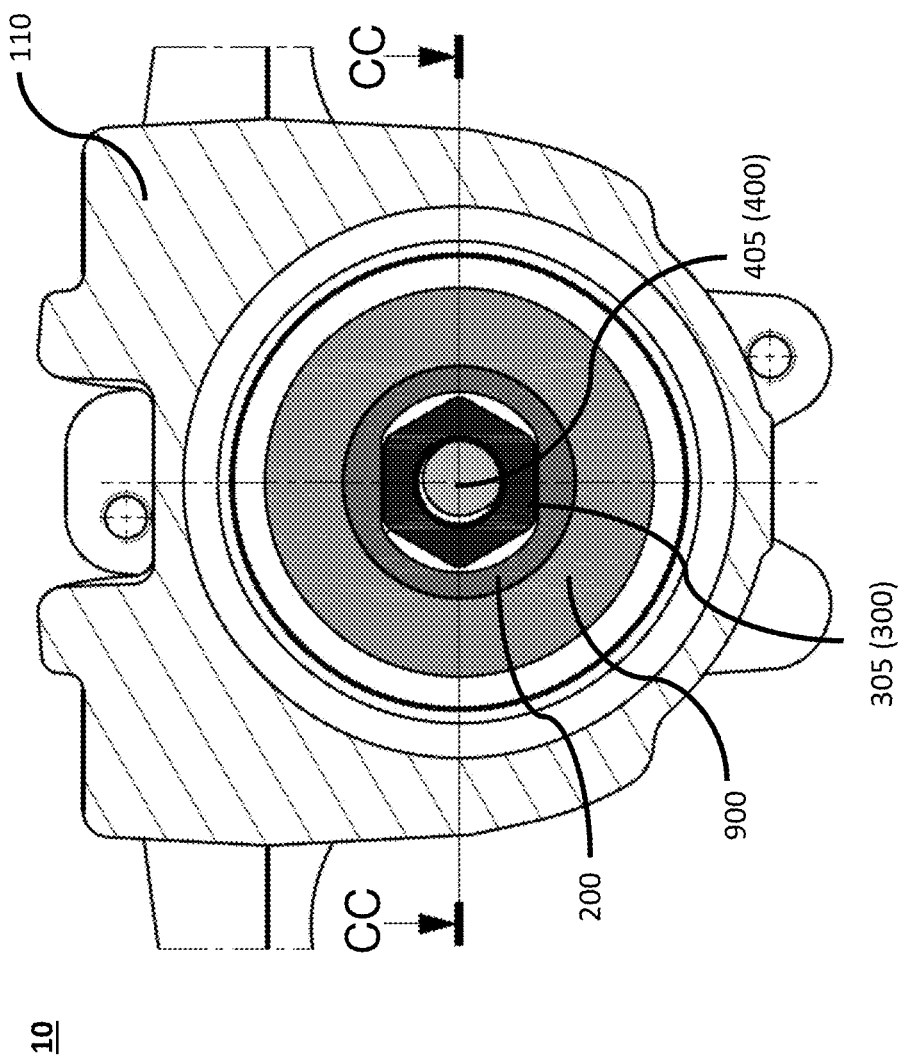
FIG. 36 illustrates a cross-sectional view of a brake assembly according to an eighth exemplary embodiment of the present disclosure.
Figure 37B:
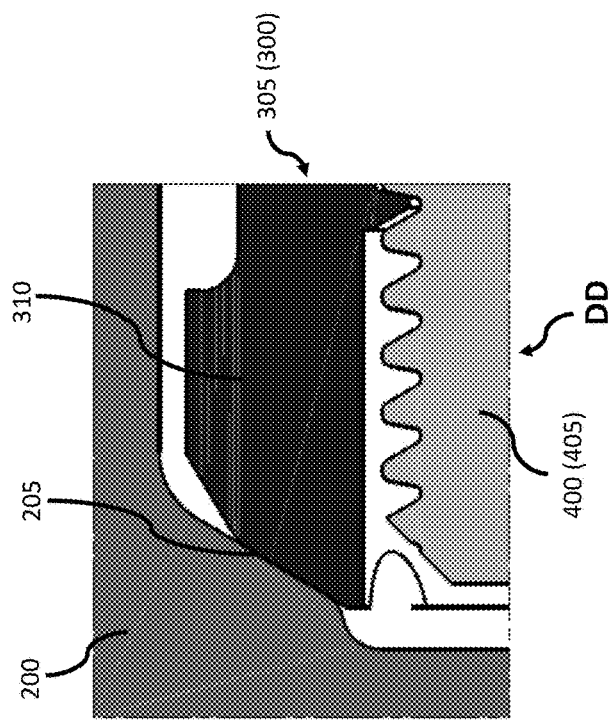
FIG. 37B is an enlarged view of a square portion DD shown in FIG. 37A according to the eighth exemplary embodiment of the present disclosure.
Figure 37A:
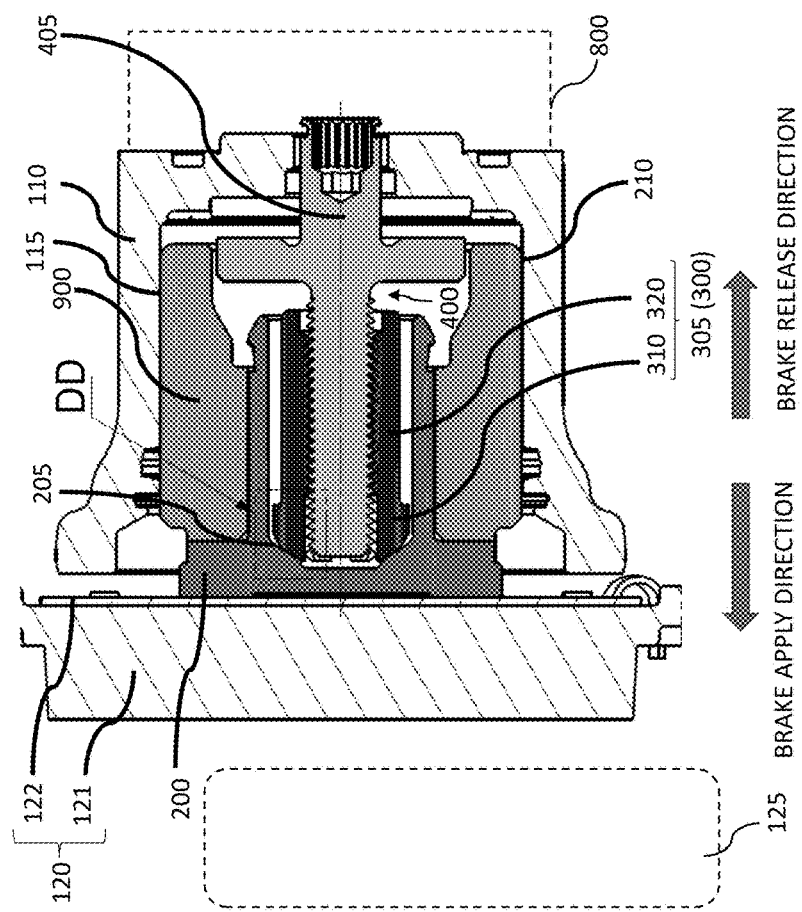
FIG. 37A shows a cross-sectional view of a brake assembly taken at cross-section CC-CC of FIG. 36 according to the eighth exemplary embodiment of the present disclosure.
Figure 38B:
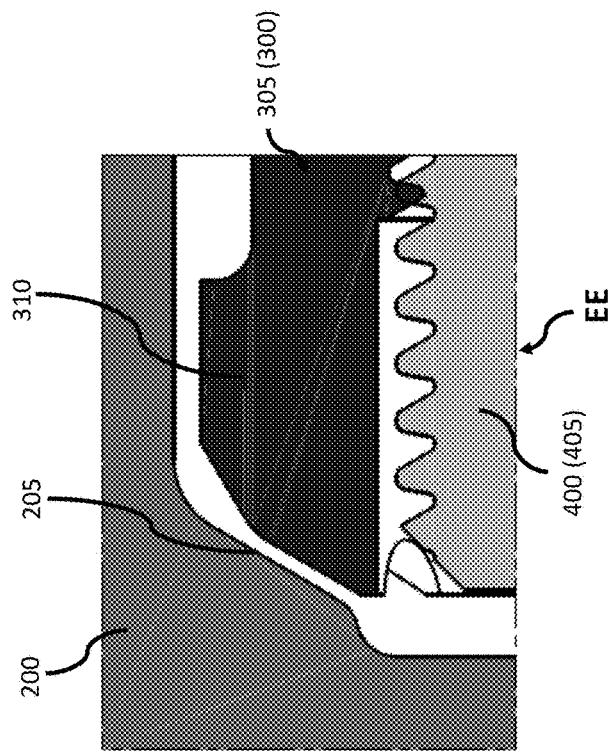
FIG. 38B is an enlarged view of a square portion EE shown in FIG. 38A according to the eighth exemplary embodiment of the present disclosure.
Figure 38A:
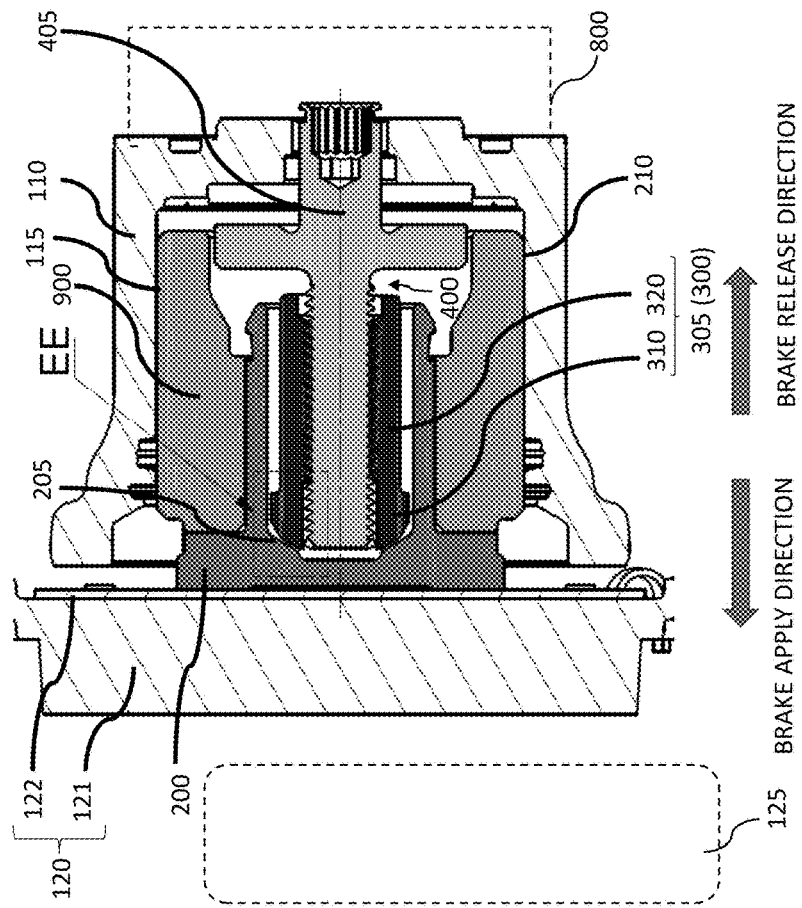
FIG. 38A shows a cross-sectional view of a brake assembly in a disengaged condition according to the eighth exemplary embodiment of the present disclosure.
Figure 39B:
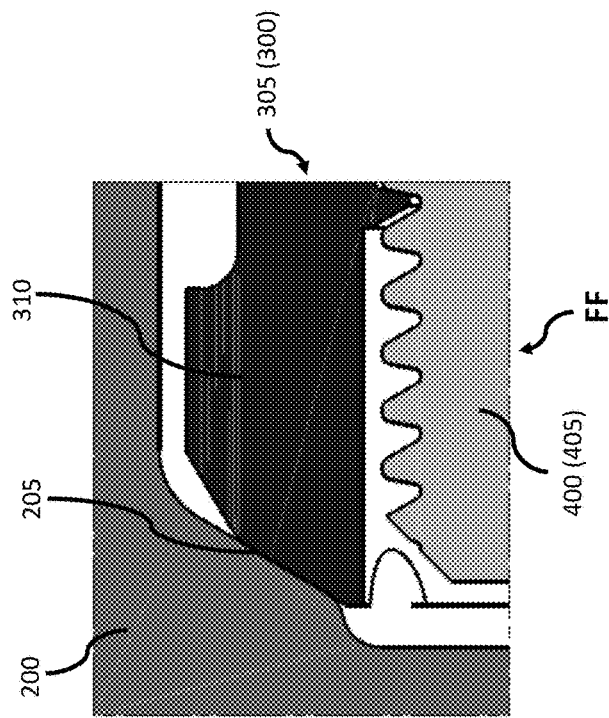
FIG. 39B is an enlarged view of a square portion FF shown in FIG. 39A according to the eighth exemplary embodiment of the present disclosure.
Figure 39A:
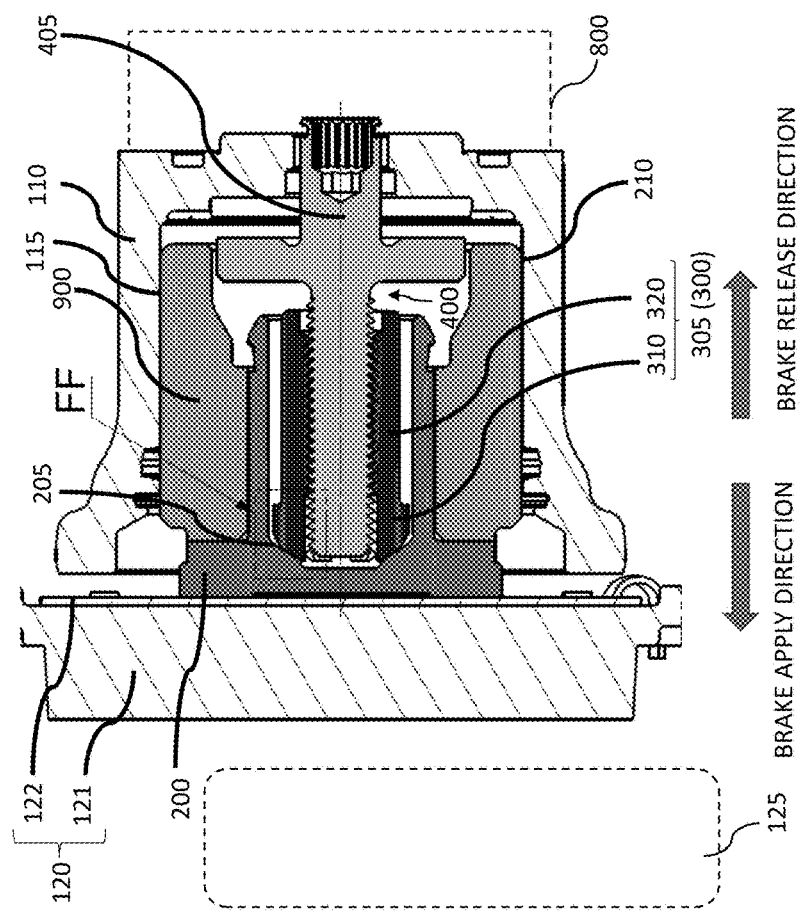
FIG. 39A shows a cross-sectional view of a brake assembly in an engaged condition according to the eighth exemplary embodiment of the present disclosure.
Figure 40:
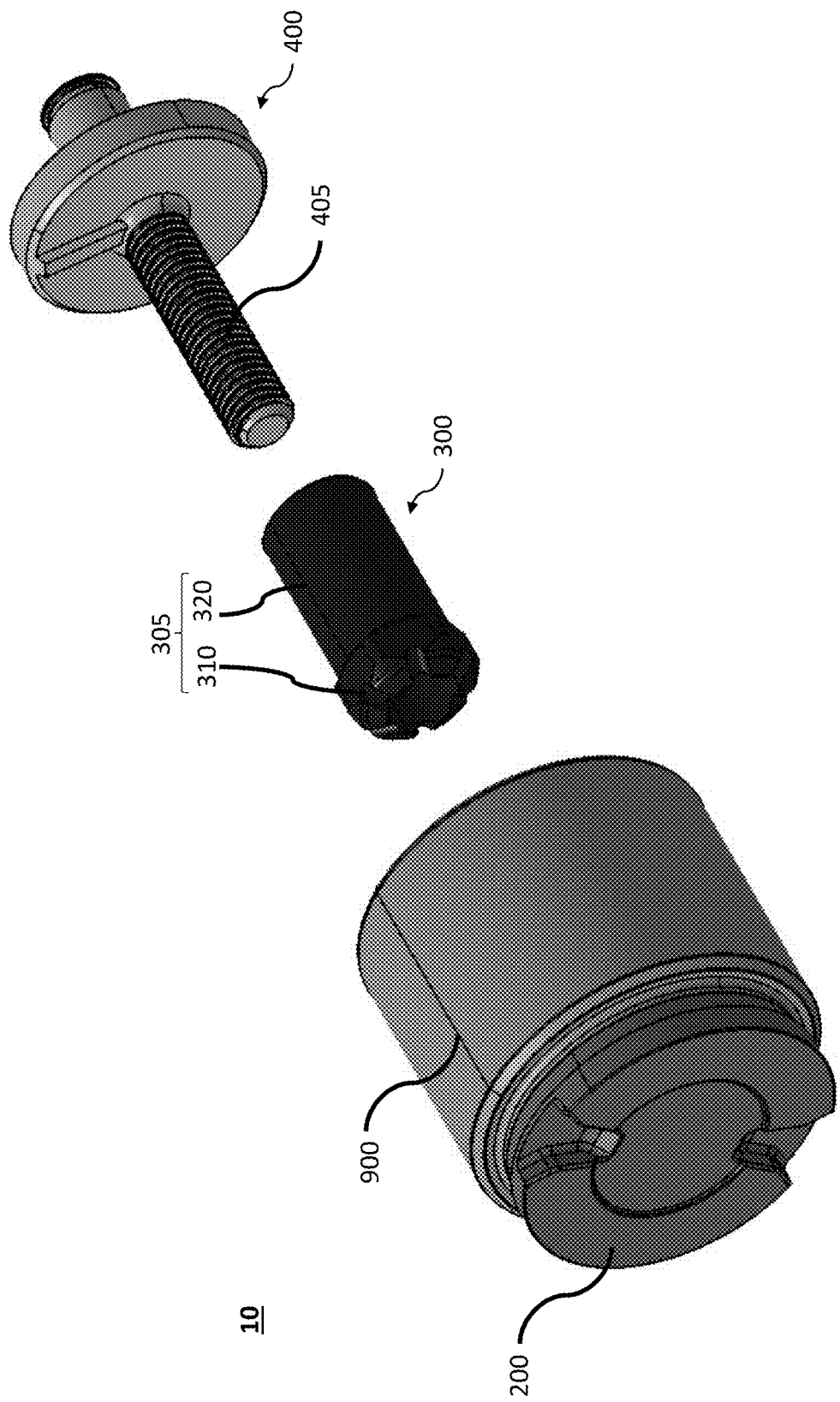
FIG. 40 is an exploded view of a brake assembly according to the eighth exemplary embodiment of the present disclosure.

The magnet 500-2 may be formed in a ring shape, a hollow cylinder shape or a disc shape. The outer or inner circumferential surface of the magnet 500-2 may have at least one of circular-shaped, square-shaped (such as square-cuts, lathe cuts, tabular cut or square rings), or polygon-shaped cross-section and a combination thereof. However, the magnet 500-2 may have any shape which can be fit in the outer groove 520 of the linearly movable structure 300 (e.g. the spindle nut 305), for instance, a shape of a nut (for example, a magnet 500-2 shown in FIG. 30).

A groove 230 corresponding to the magnet 500-2 mounted on the outer surface of the spindle nut 305 may be formed on the end inner wall 205 of the brake piston 200. A shape of the groove 230 of the brake piston 200 may be substantially mirrored to a part of the magnet 500-2 which is insertable into the groove 230. The magnet 500-2 mounted to the linearly movable structure 300 (e.g. the spindle nut 305) is insertable into the groove 230-2 of the brake piston 200 when the linearly movable structure 300 (e.g. the spindle nut 305) and the brake piston 200 approach each other. There may be a gap or clearance between the outer surface 502 of the magnet 500-2 and an inner circumferential surface 231 of the groove 230 of the brake piston 200. An end side 503 of the magnet 500-2 may contact a part of the groove 230 of the brake piston 200 when the head portion 310 of the spindle nut 305 engages with the inner surface 205 of the brake piston 200. Alternatively, the magnet 500-2 may not contact the brake piston 200 even when the head portion 310 of the spindle nut 305 engages with the inner surface 205 of the brake piston 200 in order to reduce the noise caused by the contact between the magnet 500-2 and the brake piston 200.

The operations of the second exemplary embodiment of FIGS. 6 to 10 are substantially the same as or similar to those of the first exemplary embodiment of FIGS. 1 to 5 described above, and therefore are not described herein in detail. It should be understood that operations, functions, structures, and features not described in relation to this second exemplary embodiment illustrated in FIGS. 6 to 10 can be found in the descriptions of the first exemplary embodiment shown in FIGS. 1 to 5 described above.

Third Exemplary Embodiment (FIGS. 11 to 15)

As described above in detail, both the magnet 500-1 of the first exemplary embodiment of FIGS. 1 to 5 and the magnet 500-2 of the second exemplary embodiment of FIGS. 6 to 10 are attached to the linearly movable structure 300 (e.g. the spindle nut 305). However, in a third exemplary embodiment, a magnet 500-3 is mounted to the brake piston 200 instead of the linearly movable structure 300.

Referring to FIGS. 11 to 15, in the third exemplary embodiment, the magnet 500-3 may be fixed to the brake piston 200, while the linearly movable structure 300 (e.g. the spindle nut 305) may have magnetically-attractive material attractable by the magnet 500-3. Accordingly, the attractive magnetic force can be generated between the magnet 500-3 mounted to the brake piston 200 and the linearly movable structure 300 having the magnetically-attractive material when the magnet 500-3 and the linearly movable structure 300 are in relative close proximity to each other, and therefore the magnet 500-3 mounted to the brake piston 200 may attract the linearly movable structure 300 having the magnetically-attractive material. The magnetically-attractive material of the linearly movable structure 300 may include, for example, but not limited to, one or more of a ferromagnetic material, a paramagnetic material, or a magnetized material. The ferromagnetic material may include iron, nickel and cobalt and their alloys. For instance, the linearly movable structure 300 is made of steel (e.g. low-carbon steel). However, the linearly movable structure 300 can comprise, or be made of, any material which can be magnetically attracted by the magnet 500-3. Further, the linearly movable structure 300 may include an additional magnet to magnetically interact with the magnet 500-3.

The magnet 500-3 may be positioned in a groove 240 formed on the end inner wall 205 of the brake piston 200. For example, the groove 240 of the brake piston 200, in which the magnet 500-3 is disposed, is formed at the center of the end inner wall 205 of the brake piston 200 facing the head portion 310 of the spindle nut 305. The magnet 500-3 may be press-fitted in the groove 240 of the brake piston 200. Alternatively, the magnet 500-3 may be attached to the groove 240 of the brake piston 200 using an adhesive, bolts, rivets, or other attachment mechanisms. A shape of the groove 240 of the brake piston 200 may be substantially mirrored to a part of the magnet 500-3 which is inserted into the groove 240.

The magnet 500-3 may be formed in a disc shape, a cylinder shape, or a ring shape. The outer or inner circumferential surface of the magnet 500-3 may have at least one of circular-shaped, square-shaped (such as square-oats; lathe cuts, tabular cut or square rings), or polygon-shaped cross-section and a combination thereof. However, the magnet 500-3 may have any shape which can be fit in the groove 240 of the brake piston 200, for instance, a shape of a nut. As illustrated in FIGS. 12 to 15, the magnet 500-3 may have a bore 511 at its center so that the spindle 405 is allowed to pass through the bore 511 of the magnet 500-3. Alternatively, as illustrated in FIGS. 32 to 35, instead of the bore 511, the magnet 500-3 may have a concave surface or groove 512 which can receive an end portion of the rotatable structure 400 (e.g. the spindle 405) but does not contact the rotatable structure 400.

A surface 504 of the magnet 500-3 contacting the head portion 310 of the spindle nut 305 may be angled or slanted depending on a curvature of the head portion 310 of the spindle nut 305, although it is not required.

Figure 14B:
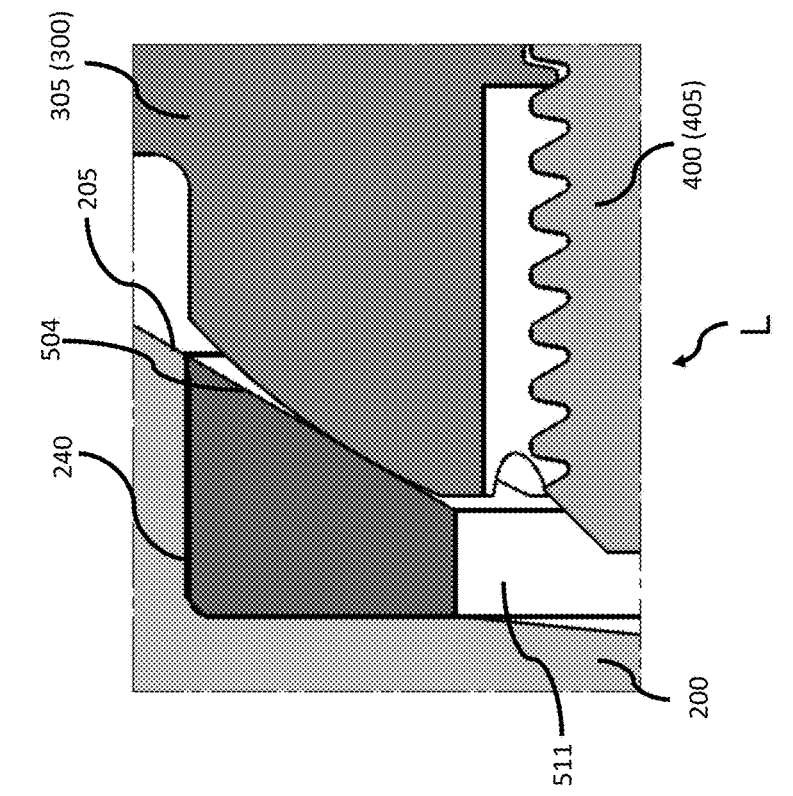
FIG. 14B is an enlarged view of a square portion L shown in FIG. 14A according to the third exemplary embodiment of the present disclosure.
Figure 14A:
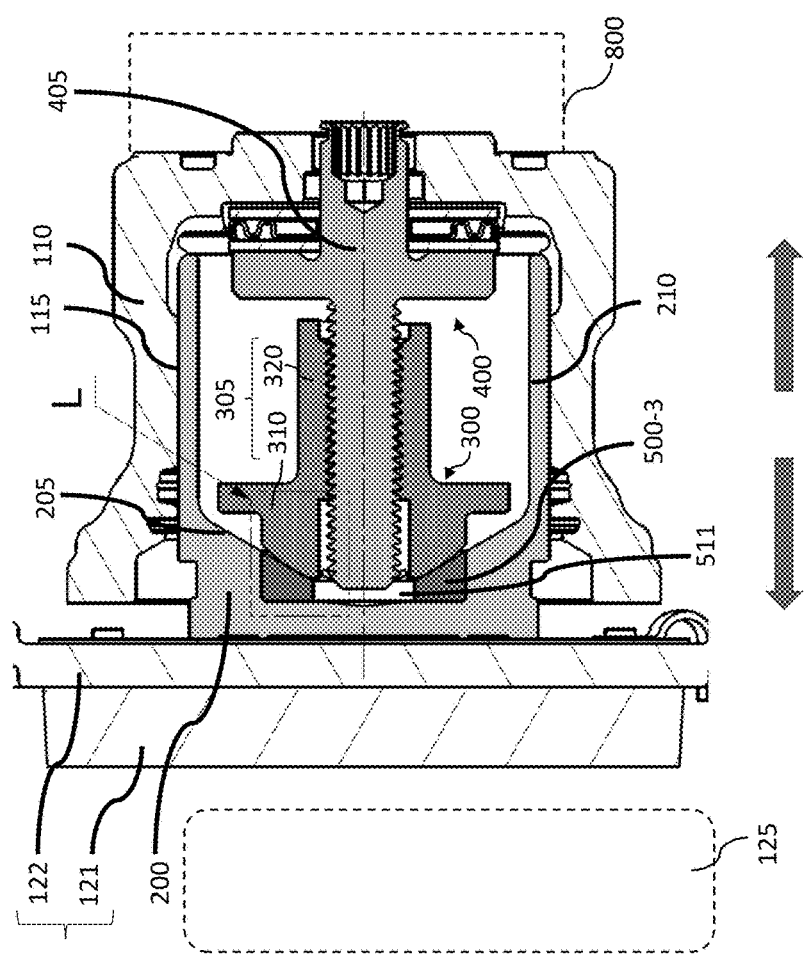
FIG. 14A shows a cross-sectional view of a brake assembly in an engaged condition according to the third exemplary embodiment of the present disclosure.
Figure 15:
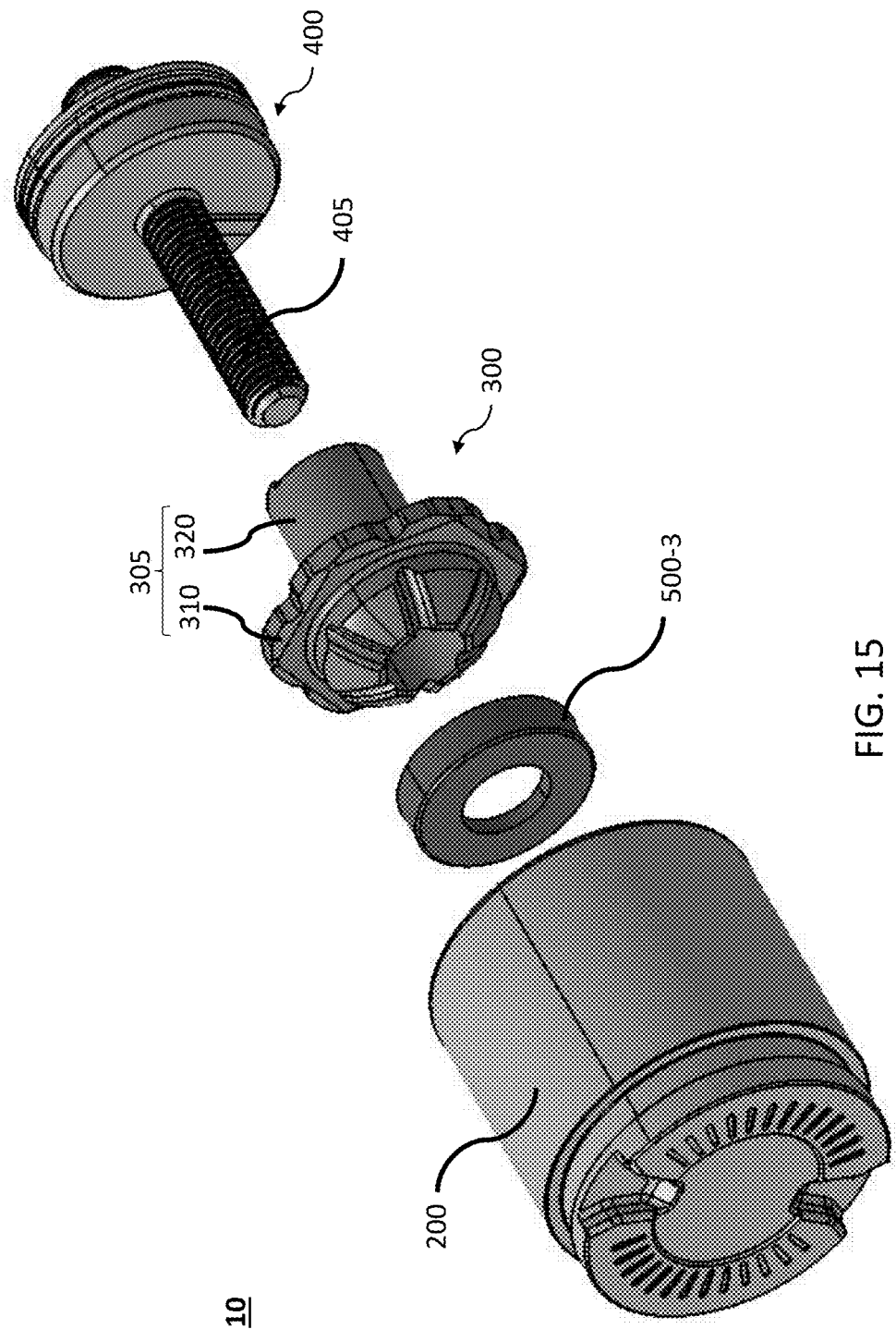
FIG. 15 is an exploded view of a brake assembly according to the third exemplary embodiment of the present disclosure.
Figure 16:
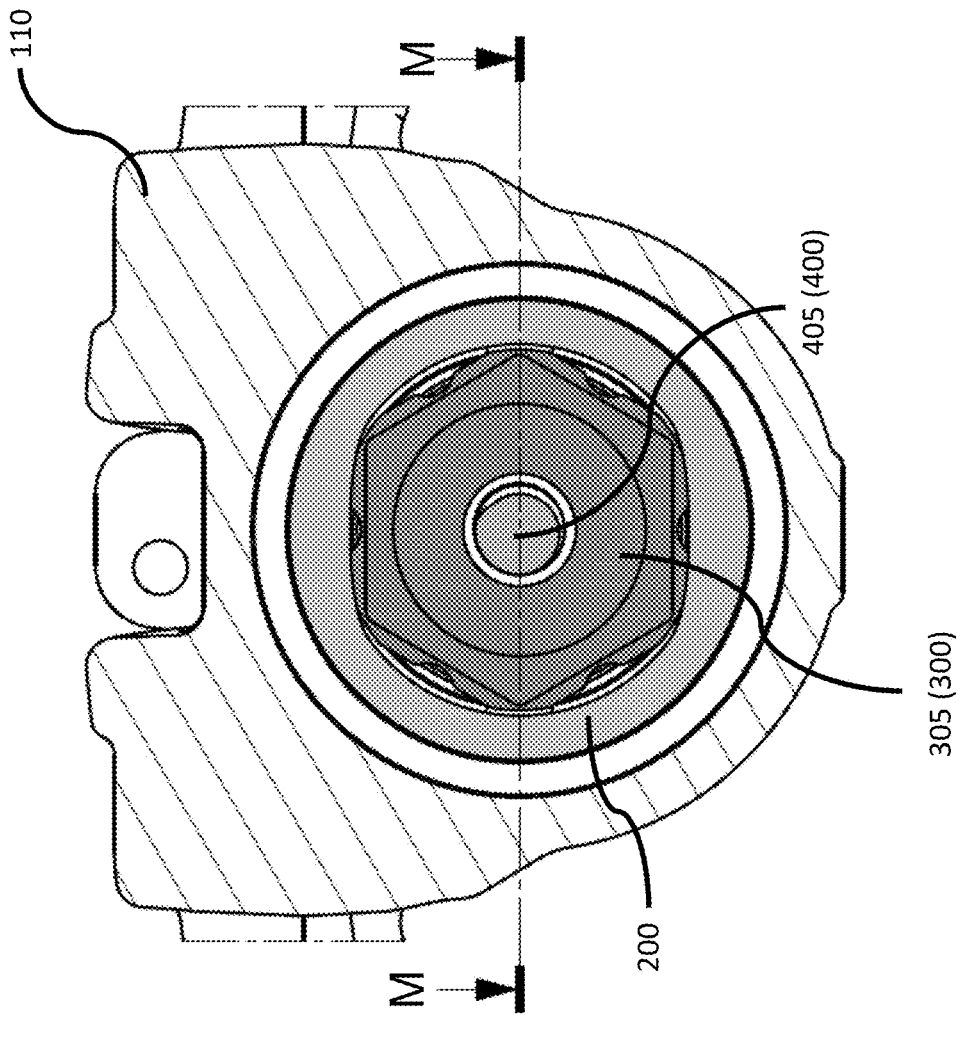
FIG. 16 illustrates a cross-sectional view of a brake assembly according to a fourth exemplary embodiment of the present disclosure.
Figure 17B:
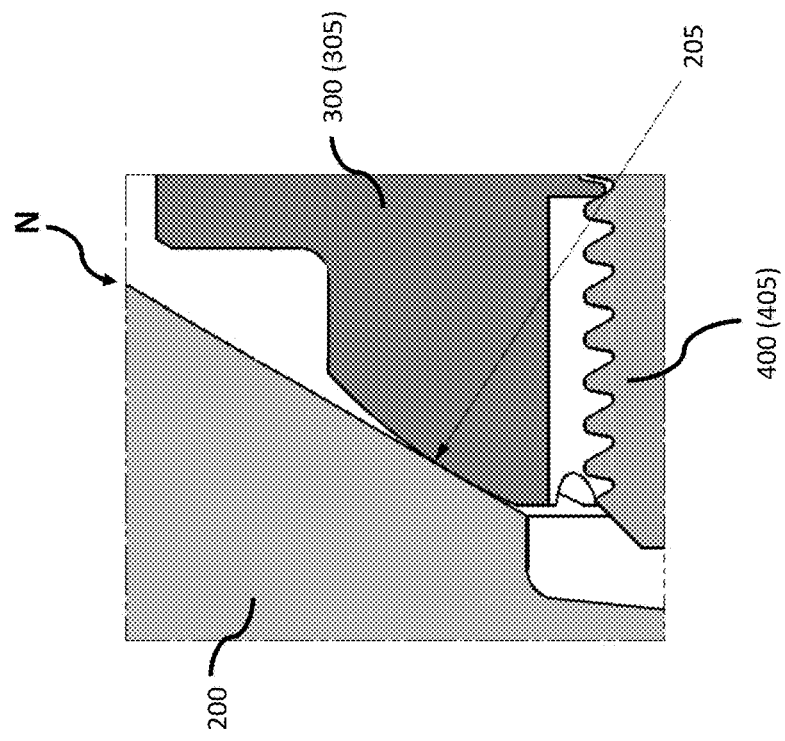
FIG. 17B is an enlarged view of a square portion N shown in FIG. 17A according to the fourth exemplary embodiment of the present disclosure.
Figure 17A:
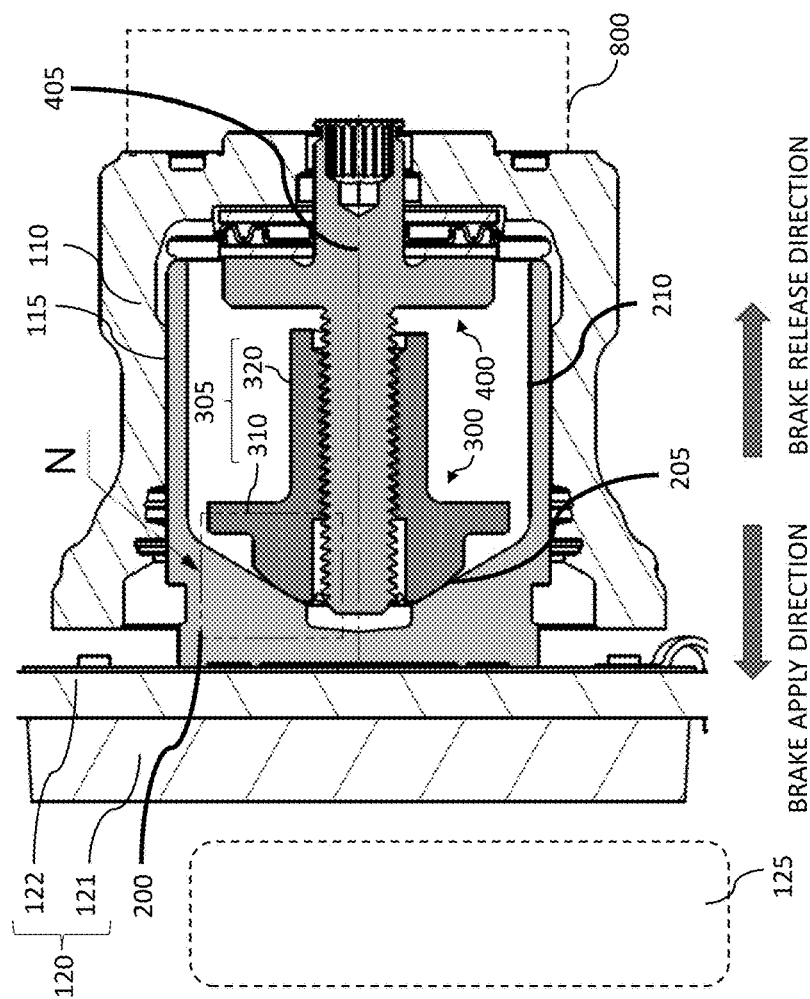
FIG. 17A shows a cross-sectional view of a brake assembly taken at cross-section M-M of FIG. 16 according to the fourth exemplary embodiment of the present disclosure.
Figure 18B:
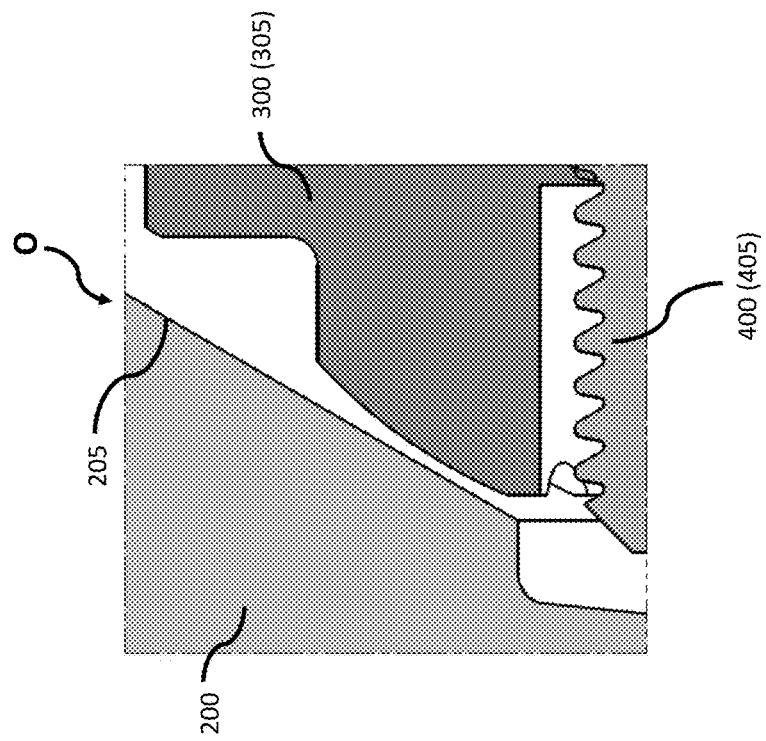
FIG. 18B is an enlarged view of a square portion O shown in FIG. 18A according to the fourth exemplary embodiment of the present disclosure.
Figure 18A:
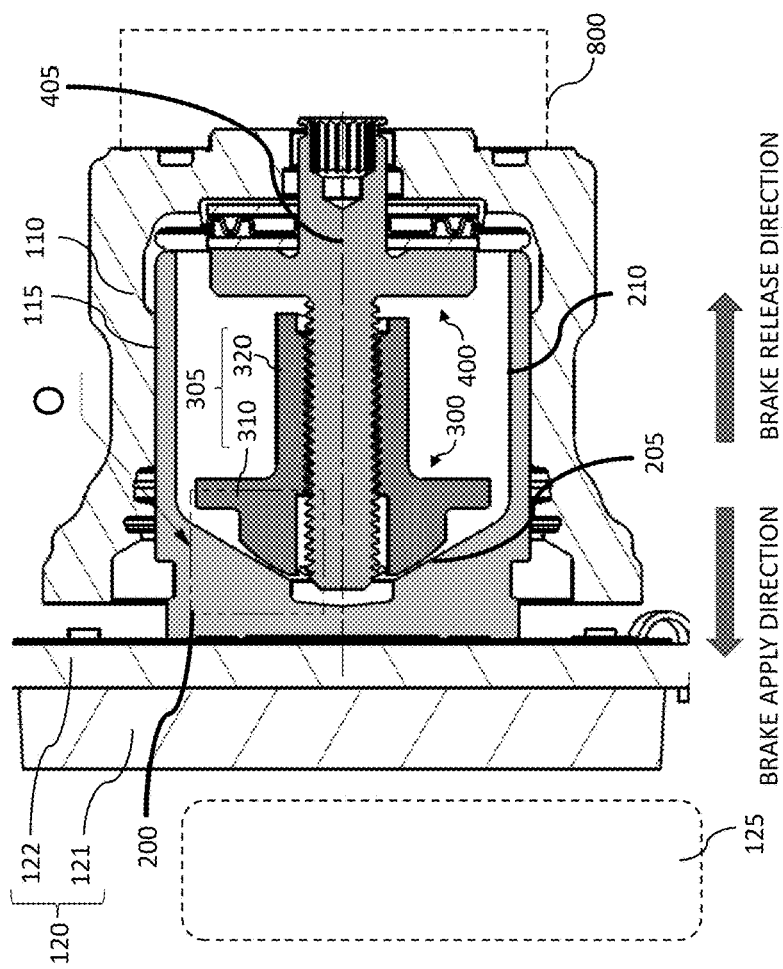
FIG. 18A shows a cross-sectional view of a brake assembly in a disengaged condition according to the fourth exemplary embodiment of the present disclosure.
Figure 20:
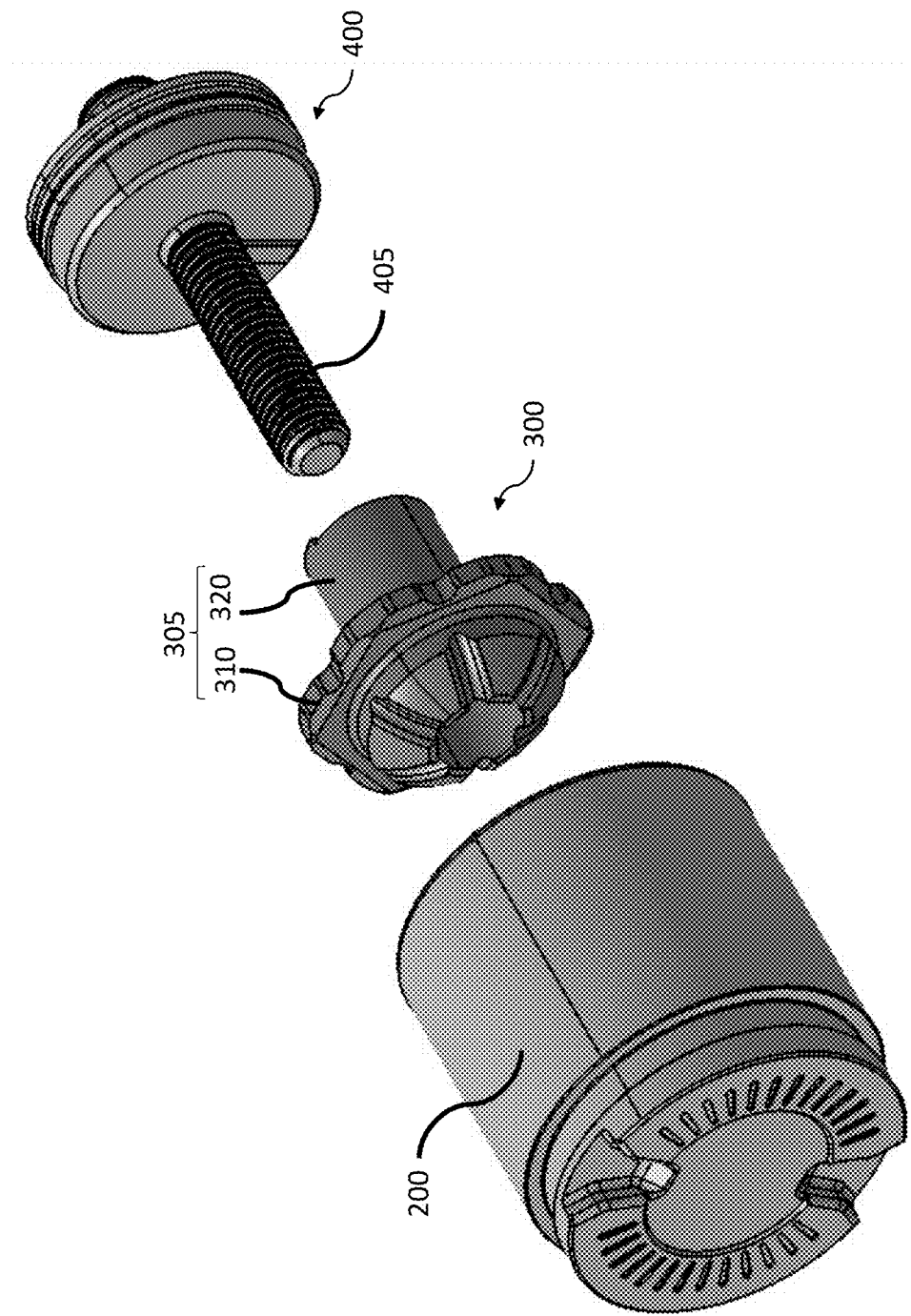
FIG. 20 is an exploded view of a brake assembly according to the fourth exemplary embodiment of the present disclosure.
Figure 21:
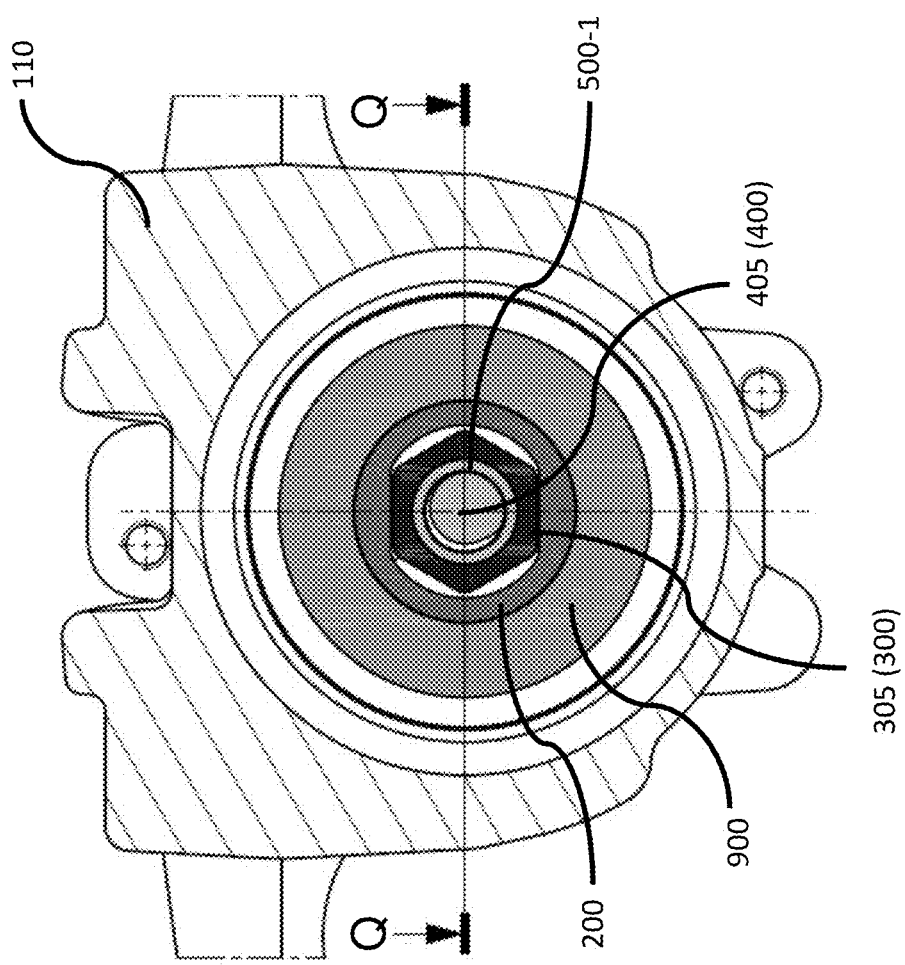
FIG. 21 illustrates a cross-sectional view of a brake assembly according to a fifth exemplary embodiment of the present disclosure.
Figure 22B:
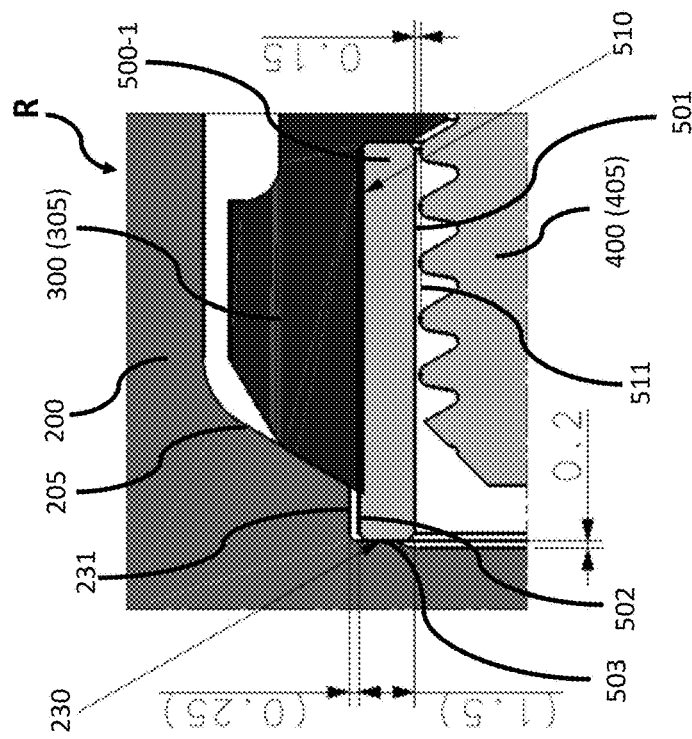
FIG. 22B is an enlarged view of a square portion R shown in FIG. 22A according to the fifth exemplary embodiment of the present disclosure.
Figure 22A:
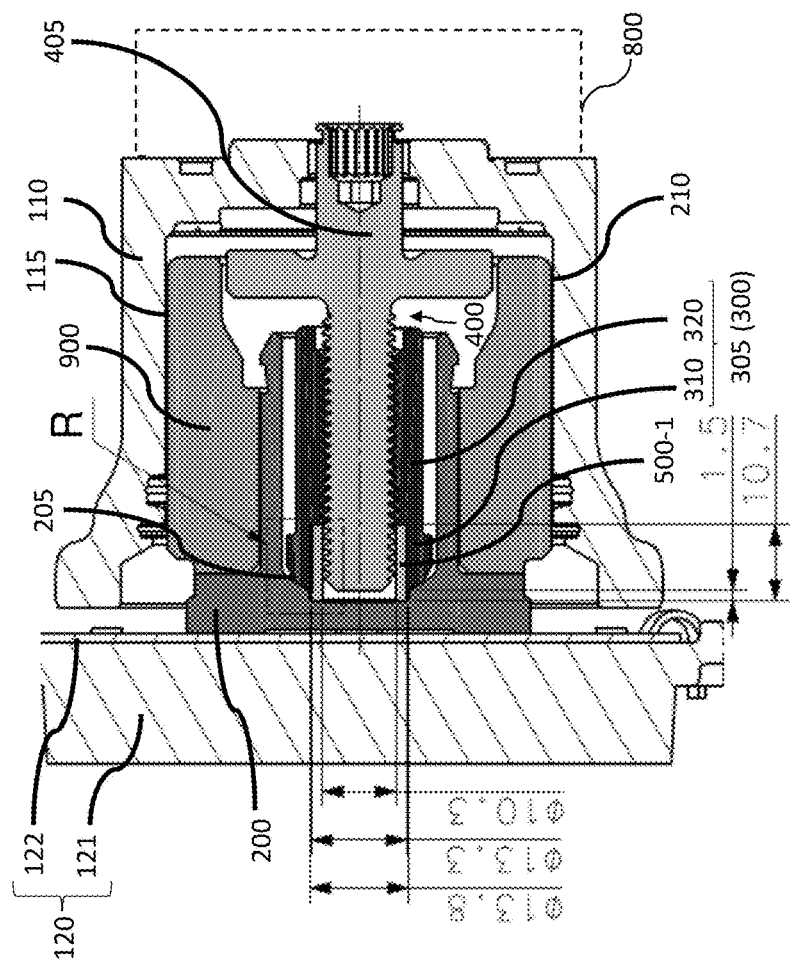
FIG. 22A shows a cross-sectional view of a brake assembly taken at cross-section Q-Q of FIG. 21 according to the fifth exemplary embodiment of the present disclosure.
Figure 24B:
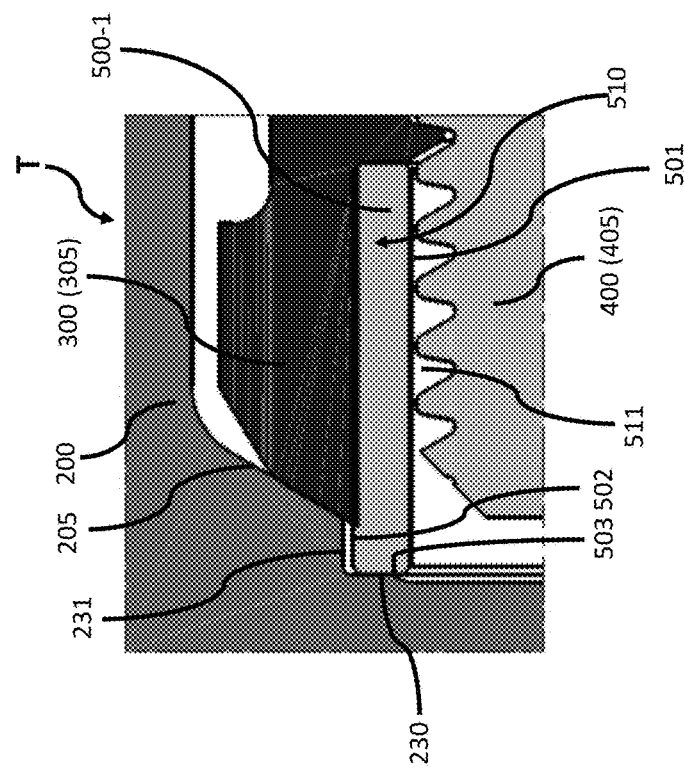
FIG. 24B is an enlarged view of a square portion T shown in FIG. 24A according to the fifth exemplary embodiment of the present disclosure.
Figure 24A:
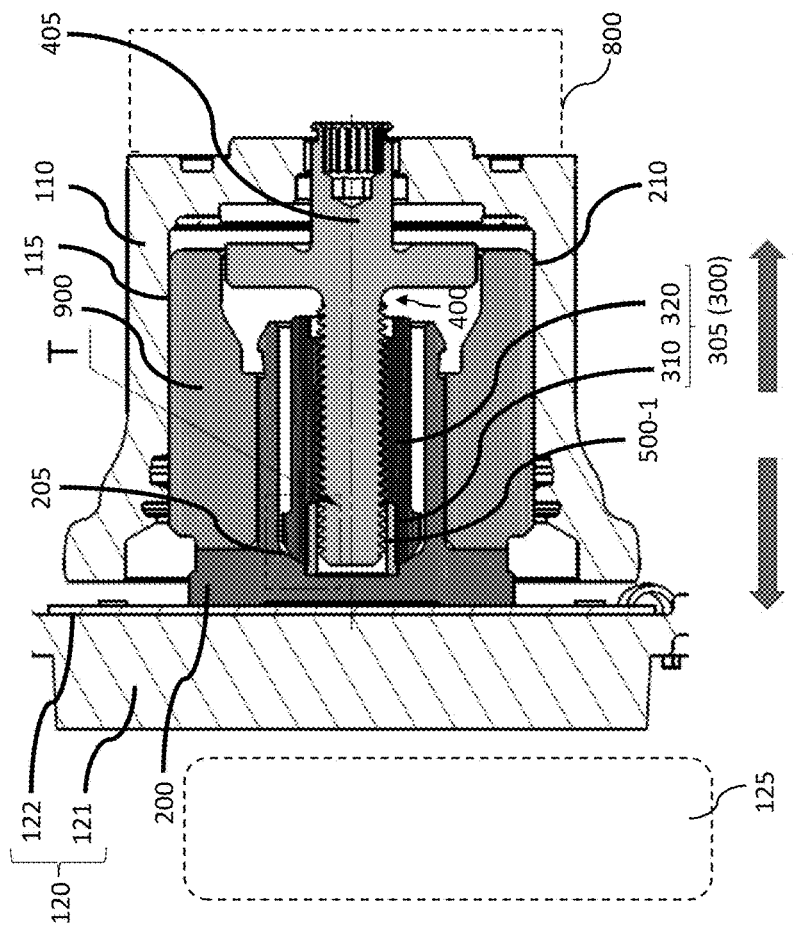
FIG. 24A shows a cross-sectional view of a brake assembly in an engaged condition according to the fifth exemplary embodiment of the present disclosure.
Figure 25:
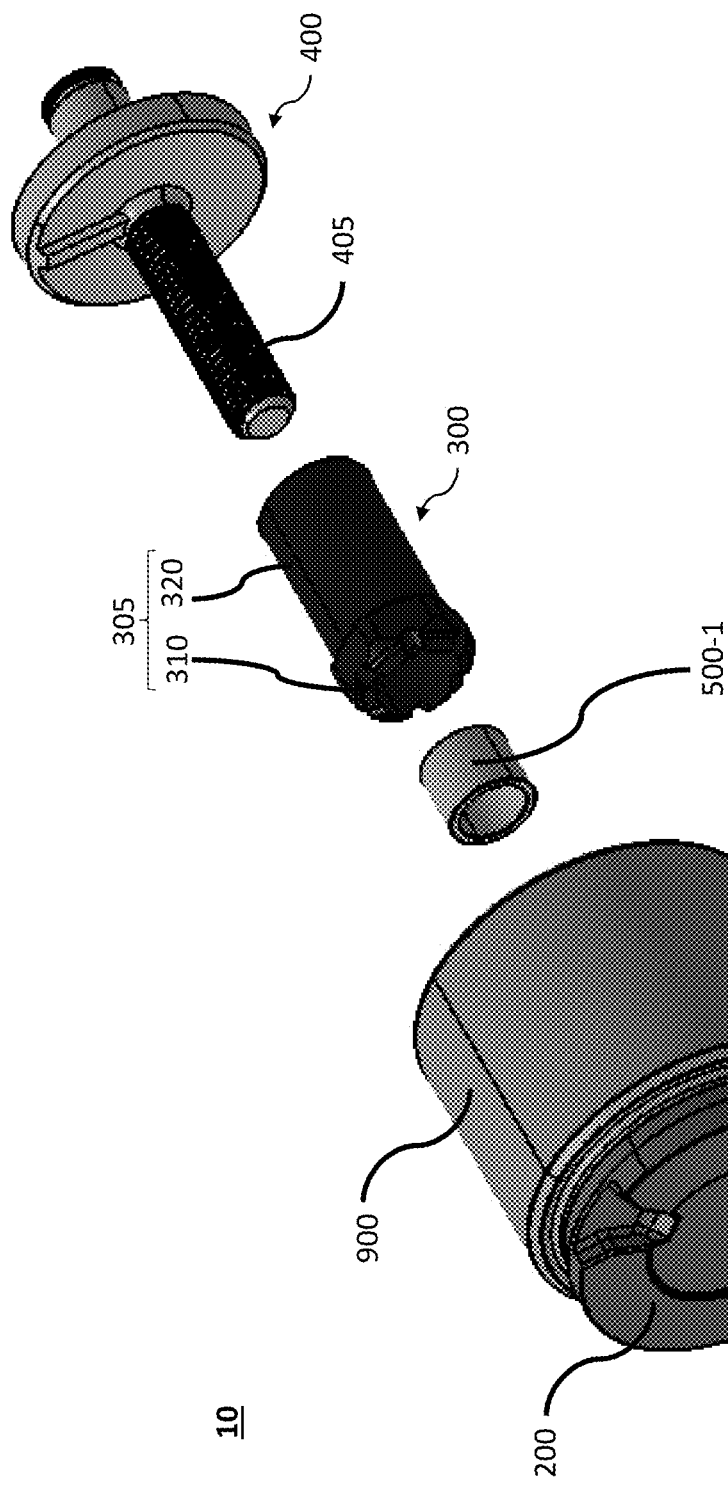
FIG. 25 is an exploded view of a brake assembly according to the fifth exemplary embodiment of the present disclosure.
Figure 26:
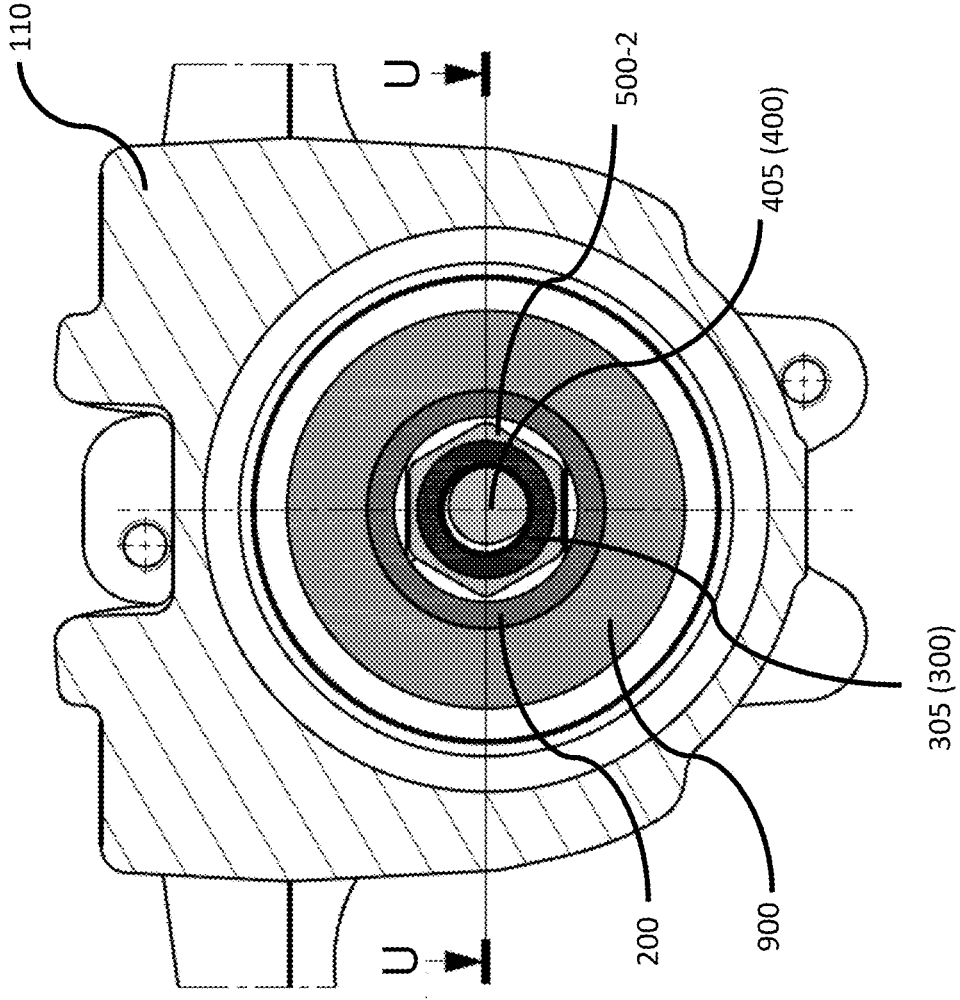
FIG. 26 illustrates a cross-sectional view of a brake assembly according to a sixth exemplary embodiment of the present disclosure.
Figure 27B:
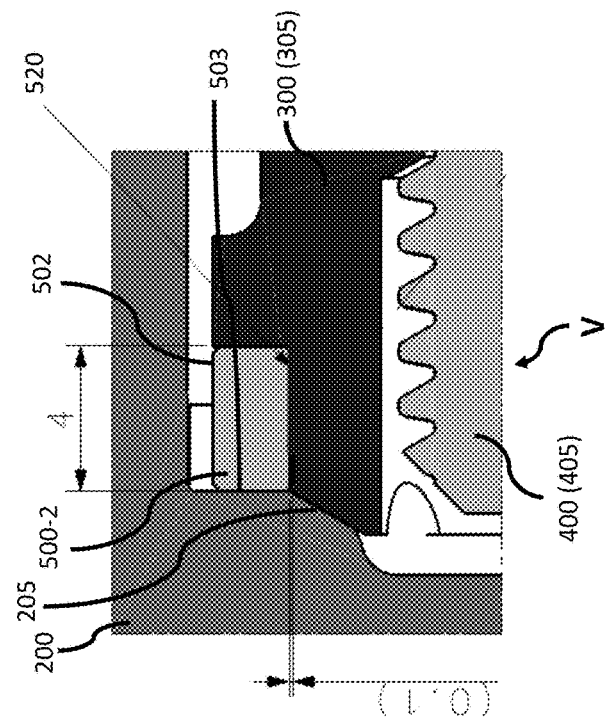
FIG. 27B is an enlarged view of a square portion V shown in FIG. 27A according to the sixth exemplary embodiment of the present disclosure.
Figure 27A:
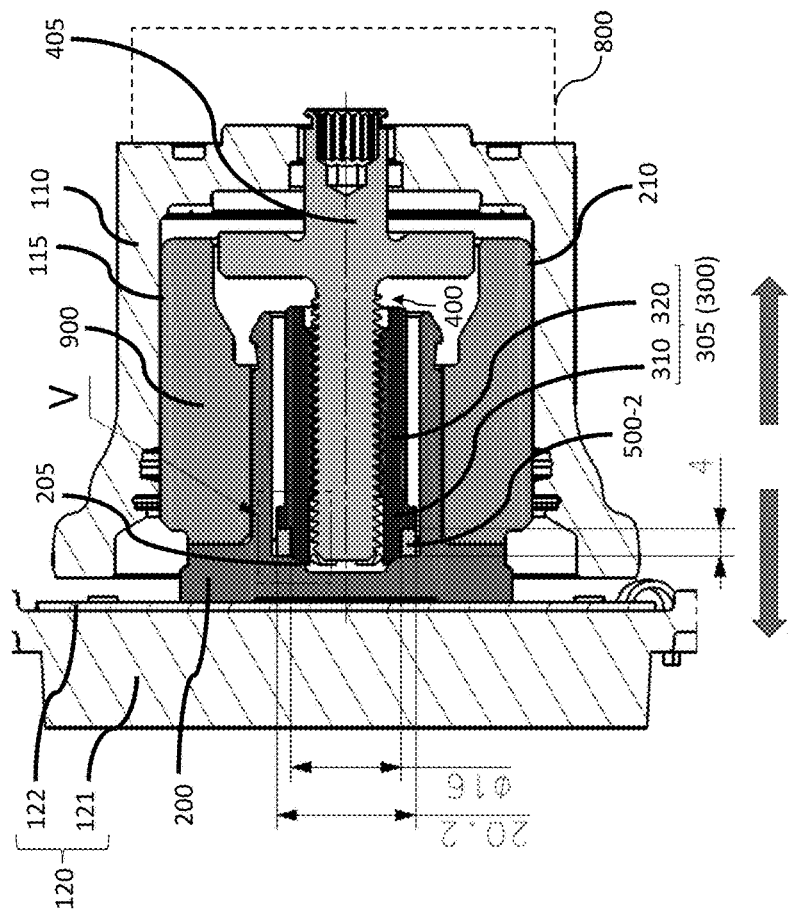
FIG. 27A shows a cross-sectional view of a brake assembly taken at cross-section U-U of FIG. 26 according to the sixth exemplary embodiment of the present disclosure.

In operation, when the parking brake is in the brake apply position, the brake piston 200 is pushed by the linearly movable structure 300 (e.g. the spindle nut 305) and is in direct or indirect contact with the brake pad assembly 120 to maintain the clamping force of the brake pad assembly 120 against the brake rotor 125. However, when the parking brake is released, the spindle nut 305 is retracted in a brake release direction away from brake rotor 125 in response to the rotation of the spindle 405, and then this linear movement of the spindle nut 305 in the brake release direction may make the inner surface 205 of the brake piston 200 disengaged from the head portion 310 of the spindle nut 305 as shown in FIGS. 13A and 13B. Then, the brake piston 200 having the magnet 500-3 is pulled toward the linearly movable structure 300 (e.g. the spindle nut 305) including the magnetically-attractive material by the attractive magnetic force generated between the linearly movable structure 300 and the magnet 500-3 mounted to the brake piston 200 so that the retraction of the brake piston 200 can cause the inner surface 205 of the brake piston 200 to be engaged with the magnet 500-3 and/or the head portion 310 of the spindle nut 305 as illustrated in FIGS. 14A and 14B, and therefore the brake piston 200 can be retracted together with the linearly movable structure 300 (e.g. the spindle nut 305). Accordingly, upon brake release, the brake piston 200 is forced back and retracted by the attractive magnetic force generated between the magnet 500-3 mounted to the brake piston 200 and the linearly movable structure 300 having the magnetically-attractive material. Thus, the magnet 500-3 advantageously assists in retracting the brake piston 200 to pull the brake piston 200 to a pre-apply position and maintain a constant and repeatable air gap between the brake piston 200 and the brake pad assembly 120. The magnet 500-3 can retract the brake piston 200 actively when the spindle nut 305 is retracted. The brake drag caused by contact forces between the brake pad assembly 120 and the brake rotor 125 due to insufficient retraction distance of the brake piston 200 during the brake release operation can be prevented, and therefore the brake piston retraction is improved.

Fourth Exemplary Embodiment (FIGS. 16 to 20)

In the first to third exemplary embodiments of FIGS. 1 to 15, the magnet 500 (e.g. magnet 500-1 to 500-3) is mounted to one of the brake piston 200 and the linearly movable structure 300 (e.g. the spindle nut 305). However, in the fourth exemplary embodiment of FIGS. 16 to 20, one of the brake piston 200 and the linearly movable structure 300 is magnetized instead of attaching the magnet 500 to one of the brake piston 200 and the linearly movable structure 300 (e.g. the spindle nut 305).

Referring to FIGS. 16 to 20, in the fourth exemplary embodiment, the linearly movable structure 300 is magnetized, and the brake piston 200 has magnetically-attractive material. Therefore, the attractive magnetic force can be generated between the magnetized linearly movable structure 300 and the brake piston 200 having the magnetically-attractive material when the magnetized linearly movable structure 300 and the brake piston 200 are in relative close proximity to each other, and therefore the magnetized linearly movable structure 300 can attract or pull the brake piston 200 having the magnetically-attractive material. The linearly movable structure 300 may include, or be made of, material which is magnetized and can create its own persistent magnetic field, such as ferromagnetic material. For instance, the ferromagnetic material may include one or more of iron, cobalt, nickel and most of their alloys, and some compounds of rare earth metals. Operations, functions, structures, and features of the fourth exemplary embodiment are the same as, or substantially similar to, the first and second exemplary embodiments shown in FIGS. 1 to 10 described above except that the magnet 500-1 or 500-2 is omitted by having the magnetized linearly movable structure 300 (e.g. the magnetized spindle nut 305).

Alternatively, the brake piston 200 is magnetized, and the linearly movable structure 300 has magnetically-attractive material. Operations, functions, structures, and features of the alternative exemplary embodiment are the same as, or substantially similar to, the third exemplary embodiment shown in FIGS. 11 to 15 described above except that the magnet 500-3 is omitted by having the magnetized brake piston 200.

Any elements, operations, functions, structures, and features not described in relation to the fourth embodiment illustrated in FIGS. 16 to 20 can be found in the descriptions of those embodiments shown in FIGS. 1 to 15 described above.

Fifth to Eighth Exemplary Embodiments (FIGS. 21 to 40)

The first to fourth exemplary embodiments of FIGS. 1 to 20 which are a metal piston type brake assembly may be implemented as a phenolic piston type brake assembly (for example, Phenolic MoC (Motor on Caliper) type brake assembly). Some exemplary embodiments applied to a phenolic piston type brake assembly are illustrated in FIGS. 21 to 40. For example, the first exemplary embodiment of FIGS. 1 to 5 of the metal piston type brake assembly can be changed to a fifth exemplary embodiment of FIGS. 21 to 25 of the phenolic piston type brake assembly, the second exemplary embodiment of FIGS. 6 to 10 of the metal piston type brake assembly can be changed a sixth exemplary embodiment of FIGS. 26 to 30 of the phenolic piston type brake assembly, the third exemplary embodiment of FIGS. 11 to 15 of the metal piston type brake assembly can be changed a seventh exemplary embodiment of FIGS. 31 to 35 of the phenolic piston type brake assembly, and the fourth exemplary embodiment of FIGS. 16 to 20 of the metal piston type brake assembly can be changed an eighth exemplary embodiment of FIGS. 36 to 40 of the phenolic piston type brake assembly. The phenolic piston type brake assembly may offer advantages such as relatively low specific gravities and relatively low thermal conductivities.

In the phenolic piston type embodiment of FIGS. 21 to 40, a phenolic outer layer 900 may be attached to the brake piston 200 (e.g. a steel core). The phenolic outer layer 900 may be positioned between the brake piston 200 (e.g. a steel core) and the brake caliper 110. The phenolic outer layer 900 may be attached to the brake piston 200 in a process known as overmolding, although it is not required. The brake piston 200 (i.e. a core) may be formed substantially of metal and the outer layer 900 attached to the brake piston 200 may be formed substantially of phenolic material. The phenolic outer layer 900 may be slidably movable together with the brake piston 200 with respect to the brake caliper 110.

The outer layer 900 may have a polymeric material, such as a thermosetting or thermoplastic polymer. Preferred polymeric material can include polymeric material made from a phenolic resin, or other appropriate polymeric material having suitable strength, rigidity, chemical resistance, low compressibility, and temperature capabilities for use in the environment of a disk brake piston. For example, a polymeric material having a temperature stability up to approximately 150° C., 200° C., 250° C. 300° C., 350° C. or higher can be favorably incorporated into the design. Suitable polymeric materials can be filled, such as glass fiber-filled, mineral-filled, metal-filled, and/or filled with other material appropriate for the strength temperature and durability requirements, or unfilled. Polymeric materials may be laminated and/or reinforced as desired. Suitable polymeric materials can include, but are not limited to, those made from phenolic resins such as novolacs and resols and include cross-linked forms of phenolic resins.

The magnets 500 (for example, magnets 500-1 to 500-3), the brake caliper 110, the brake piston 200, the linearly movable structure 300, the rotatable structure 400, the actuator assembly 800, and their parts, components, and elements of the fifth to eighth exemplary embodiments of FIGS. 21 to 40 can be constructed the same as or similar to those of the first to fourth exemplary embodiments of FIGS.

1 to 20 described above. It should be understood that structures, features, materials, operations and functions not specifically discussed with respect to the fifth to eighth exemplary embodiments of FIGS. 21 to 40 can be the same as or similar to the first to fourth exemplary embodiments of FIGS. 1 to 20. Any elements not described in relation to the fifth to eighth exemplary embodiments of FIGS. 21 to 40 can be found in the descriptions of the first to fourth exemplary embodiments of FIGS. 1 to 20 described above. For example, the descriptions for the fifth exemplary embodiment of FIGS. 21 to 25 can be found in descriptions of the first exemplary embodiment of FIGS. 1 to 5, the descriptions for the sixth exemplary embodiment of FIGS. 26 to 30 can be found in descriptions of the second exemplary embodiment of FIGS. 6 to 10, the descriptions for the seventh exemplary embodiment of FIGS. 31 to 35 can be found in descriptions of the third exemplary embodiment of FIGS. 11 to 15, and the descriptions for the fifth exemplary embodiment of FIGS. 36 to 40 can be found in descriptions of the fourth exemplary embodiment of FIGS. 16 to 20.

Although the example embodiments have been described in detail, it should be understood that various changes, substitutions and alterations can be made herein without departing from the spirit and scope of the present disclosure as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A brake assembly comprising:
   a brake piston configured to be movable for a brake apply or release, the brake piston having an inner wall forming a piston cavity;
   a linearly movable structure positioned within the piston cavity of the brake piston, the linearly movable structure configured to be linearly movable within the piston cavity in response to rotation of a rotatable structure operably coupled to the linearly movable structure; and
   a magnet disposed between the brake piston and the linearly movable structure so that the brake piston is movable toward the linearly movable structure in response to linear movement of the linearly movable structure by magnetic field generated by the magnet,
   wherein:
   the magnet is mounted to the linearly movable structure, and
   the brake piston has magnetically-attractive material attractable by the magnet so that an attractive magnetic force is generated between the brake piston and the magnet mounted to the linearly movable structure.

2. The brake assembly of claim 1, wherein the magnet is positioned in an inner groove formed on an inner circumferential surface at an end portion of the linearly movable structure.

3. The brake assembly of claim 1, wherein there is a clearance between the magnet mounted to the linearly movable structure and the rotatable structure operably coupled to the linearly movable structure.

4. The brake assembly of claim 2, wherein the magnet protrudes outwardly from the inner groove of the linearly movable structure toward the inner wall of the brake piston.

5. The brake assembly of claim 1, wherein the inner wall of the brake piston has a groove in which the magnet mounted to the linearly movable structure is insertable when one or both of the linearly movable structure and the brake piston approaches another or each other.

6. The brake assembly of claim 5, wherein there is a clearance between an outer circumferential surface of the magnet mounted to the linearly movable structure and an inner circumferential surface of the groove of the brake piston into which the magnet mounted to the linearly movable structure is insertable.

7. The brake assembly of claim 1, wherein a diameter of a groove of the inner wall of the brake piston into which the magnet is insertable is greater than a diameter of the magnet positioned in an inner groove formed on an inner circumferential surface of the linearly movable structure.

8. The brake assembly of claim 1, wherein the magnet has a bore through which the rotatable structure is allowed to pass.

9. The brake assembly of claim 1, wherein the magnet is positioned in an outer groove formed on an outer circumferential surface at an end portion of the linearly movable structure.

10. The brake assembly of claim 9, wherein the inner wall of the brake piston has a groove into which the magnet is insertable when one or both of the linearly movable structure and the brake piston approach another or each other.

11. The brake assembly of claim 1, wherein the magnet mounted to the linearly movable structure is configured to attract the brake piston having the magnetically-attractive material.

12. A brake assembly comprising:
a brake piston configured to be movable for a brake apply or release, the brake piston having an inner wall forming a piston cavity;
a linearly movable structure positioned within the piston cavity of the brake piston, the linearly movable structure configured to be linearly movable within the piston cavity in response to rotation of a rotatable structure operably coupled to the linearly movable structure; and
a magnet disposed between the brake piston and the linearly movable structure so that the brake piston is movable toward the linearly movable structure in response to linear movement of the linearly movable structure by magnetic field generated by the magnet, wherein:
the magnet is mounted to the inner wall of the brake piston, and
the linearly movable structure has magnetically-attractive material attractable by the magnet so that an attractive magnetic force is generated between the linearly movable structure and the magnet mounted to the brake piston.

13. The brake assembly of claim 1, wherein the inner wall of the brake piston has a groove to which the magnet is mounted.

14. The brake assembly of claim 1, wherein the magnet has a concave surface configured to receive an end portion of the rotatable structure and/or the linearly movable structure.

15. A brake assembly comprising:
a brake piston configured to be movable for a brake apply or release, the brake piston having an inner wall forming a piston cavity; and
a linearly movable structure positioned within the piston cavity of the brake piston, the linearly movable structure configured to be linearly movable within the piston cavity in response to rotation of a rotatable structure operably coupled to the linearly movable structure,
wherein the linearly movable structure has a magnetized material and the brake piston has magnetically-attractive material attractable by magnet field generated by the magnetized material of the linearly movable structure so that the brake piston is movable in response to linear movement of the linearly movable structure by the magnet field generated by the magnetized material of the linearly movable structure.

16. A brake assembly comprising:
a brake piston configured to be movable for a brake apply or release, the brake piston having an inner wall forming a piston cavity; and
a linearly movable structure positioned within the piston cavity of the brake piston, the linearly movable structure configured to be linearly movable within the piston cavity in response to rotation of a rotatable structure operably coupled to the linearly movable structure,
wherein the brake piston is magnetized and the linearly movable structure has magnetically-attractive material attractable by magnet field generated by the magnetized brake piston so that the magnetized brake piston is movable in response to linear movement of the linearly movable structure by an attractive magnetic force generated between the magnetized brake piston and the linearly movable structure having the magnetically-attractive material.

* * * * *